US011294912B2

(12) United States Patent
Chung et al.

(10) Patent No.: US 11,294,912 B2
(45) Date of Patent: Apr. 5, 2022

(54) BROWSING METHODS, COMPUTER PROGRAM PRODUCTS, SERVERS AND SYSTEMS

(71) Applicant: SKYSCANNER LIMITED, London (GB)

(72) Inventors: Stanley Chung, London (GB); Marcin Maruszak, London (GB)

(73) Assignee: SKYSCANNER LIMITED, London (GB)

( * ) Notice: Subject to any disclaimer, the term of this patent is extended or adjusted under 35 U.S.C. 154(b) by 143 days.

(21) Appl. No.: 16/095,038

(22) PCT Filed: Apr. 19, 2017

(86) PCT No.: PCT/GB2017/051092
§ 371 (c)(1),
(2) Date: Oct. 19, 2018

(87) PCT Pub. No.: WO2017/182803
PCT Pub. Date: Oct. 26, 2017

(65) Prior Publication Data
US 2019/0146974 A1    May 16, 2019

(30) Foreign Application Priority Data
Apr. 19, 2016   (GB) ..................... 1606794

(51) Int. Cl.
*G06F 16/00*        (2019.01)
*G06F 16/2457*      (2019.01)
(Continued)

(52) U.S. Cl.
CPC .... *G06F 16/24578* (2019.01); *G06F 3/04842* (2013.01); *G06F 16/248* (2019.01); *G06F 16/9535* (2019.01)

(58) Field of Classification Search
CPC .......... G06F 16/24578; G06F 16/9535; G06F 16/248; G06F 3/04842
See application file for complete search history.

(56) References Cited

U.S. PATENT DOCUMENTS 7,890,526 B1 *  2/2011  Brewer ................ G06F 16/242
                                                    707/767
8,620,891 B1    12/2013  Thirumalai
(Continued)

FOREIGN PATENT DOCUMENTS

EP          1 619 597 A1     1/2006

OTHER PUBLICATIONS

Google Patent. https://patents.google.com/?q=search+result+&q=highlighted&q=feedback&q=interact&num=100&patents=false&scholar. 2020. (Year: 2020).*
(Continued)

*Primary Examiner* — Syed H Hasan
(74) *Attorney, Agent, or Firm* — Saul Ewing Arnstein & Lehr LLP

(57) ABSTRACT

There is provided a computer-implemented method of providing a set of alternative search results, the method including the steps of: (i) receiving a search request; (ii) searching a database to provide a first set of a plurality of search results, each search result including a plurality of attributes; (iii) identifying a best search result as the initially highlighted result; (iv) providing the highlighted search result for display; (v) receiving a selection of an attribute in the highlighted search result; (vi) providing the set of alternative search results, in which the selected attribute is varied with respect to the highlighted search result, and (vii) providing the set of alternative search results for display. Related computer program products, servers and systems are also provided.

34 Claims, 20 Drawing Sheets

(51) Int. Cl.
*G06F 16/9535* (2019.01)
*G06F 16/248* (2019.01)
*G06F 3/04842* (2022.01)

(56) References Cited

U.S. PATENT DOCUMENTS

| | | | | |
|---|---|---|---|---|
| 2003/0177044 A1* | 9/2003 | Sokel | ................ | G06Q 10/02 |
| | | | | 705/5 |
| 2008/0077570 A1* | 3/2008 | Tang | ................ | G06F 16/3346 |
| 2008/0091670 A1* | 4/2008 | Ismalon | ............. | G06F 16/3322 |
| 2011/0218884 A1* | 9/2011 | Kothari | ............. | G06Q 30/02 |
| | | | | 705/27.1 |
| 2012/0072425 A1 | 3/2012 | Yaseen et al. | | |
| 2012/0084283 A1* | 4/2012 | Chitiveli | ............ | G06F 16/3326 |
| | | | | 707/728 |
| 2013/0346400 A1* | 12/2013 | Ramsey | ............. | G06F 16/951 |
| | | | | 707/723 |
| 2014/0040301 A1* | 2/2014 | Chadha | .............. | G06F 40/30 |
| | | | | 707/765 |
| 2014/0149390 A1* | 5/2014 | Chen | ................ | G06F 16/3326 |
| | | | | 707/722 |
| 2015/0199434 A1* | 7/2015 | Wu | .................. | G06F 16/9535 |
| | | | | 707/707 |
| 2017/0220680 A1* | 8/2017 | Shattuck | ............ | G06F 16/951 |
| 2017/0277791 A1* | 9/2017 | Bai | ................... | G06F 16/9535 |
| 2017/0293665 A1* | 10/2017 | Brodziak | ............ | G06F 16/248 |
| 2019/0258685 A1* | 8/2019 | English | .............. | G06F 16/951 |

OTHER PUBLICATIONS

Baeza-Yates R. et al., "Modern Information Retrieval, Chapter 13: Searching the web," Modern Information Retrieval, ACM Press, pp. 367-395 (Jan. 31, 1999) XP002404513, pp. 376-382.
Baeza-Yates R. et al., "Modern Information Retrieval, Chapter 2: Modeling," Modern Information Retrieval, ACM Press, pp. Complete58 (Jan. 31, 1999) XP002299413.
International Search Report, dated May 13, 2017, and Written Opinion, issued in International Application No. PCT/GB2017/051092.

* cited by examiner

| | |
|---|---|
| Price | £1104.75 |
| OUTBOUND | |
| From | London Heathrow |
| To | New York John F. Kennedy |
| Take off | 12:20 |
| Landing | 19:40 |
| Duration | 11h 20m |
| Airline | Aer Lingus |
| # of Stops | 1 stops |
| INBOUND | |
| From | New York John F. Kennedy |
| To | London Gatwick |
| Take off | 23:00 |
| Landing | 09:30 |
| Duration | 6h 30m |
| Airline | Norwegian |
| # of Stops | non-stop |

Best deal found by Skyscaner
Amend details as you like!

| | |
|---|---|
| Restart | ← Prev  Next → |

Amend details as you like!

| | |
|---|---|
| Price | £1104.75 |
| OUTBOUND | |
| From | London Heathrow |
| To | New York John F. Kennedy |
| Take off | 12:20 |
| Landing | 19:40 |
| Duration | 11h 20m |
| Airline | Aer Lingus |
| # of Stops | 1 stops |
| INBOUND | |
| From | New York John F. Kennedy |
| To | London Gatwick |
| Take off | 23:00 |
| Landing | 09:30 |
| Duration | 6h 30m |
| Airline | Norwegian |
| # of Stops | non-stop |

|  | From | To | Time | ... | Operator |
|---|---|---|---|---|---|
| Itinerary #1 | LHR | PAR | 10:00 | ... | AF |
| Itinerary #2 | EDI | LGA | 13:30 | ... | AA |
| Itinerary #3 | LCY | JFK | 09:45 | ... | KL |
| : | : | : | : | : | : |

202

|  | From | To | Time | ... | Operator |
|---|---|---|---|---|---|
| Result #1 | LCY | JFK | 09:45 | ... | KL |
| Result #2 | LHR | JFK | 06:10 | ... | LH |
| Result #3 | LGW | LGA | 16:40 | ... | AA |
| : | : | : | : | : | : |

203

|  | From | To | Time | ... | Operator |
|---|---|---|---|---|---|
| Pinned | False | False | True | ... | False |
| Sort | Distance | ABC | Time | ... | ABC |
| Filter | null | null | Range | ... | Group |

204

|  | From | To | Time | ... | Operator |
|---|---|---|---|---|---|
| Result #2 | LHR | JFK | 06:10 | ... | LH |

205

|  | From | To | Time | ... | Operator |
|---|---|---|---|---|---|
| Alt. #1 | LHR | JFK | 06:10 | ... | LH |
| Alt. #2 | LHR | LGA | 18:20 | ... | BA |
| Alt. #3 | LHR | EWR | 06:10 | ... | BA |
| : | : | : | : | : | : |

06:25 - 22:14
(departs 10 min earlier, -£10)

06:55 - 19:32
(non-stop, +£57)

06:25 - 21:20
(arrives 54 min earlier, +£12)

08:46 - 00:15+1
(departs 2 hours later, £14)

09:41 - 00:15+1
(departs 3 hours later, arrives on next day, -£5)

07:32 - 19:37
(non-stop, +£141)

06:09 - 03:34+1
(2 stops, £47)

06:45+1 - 22:14+1
(travel 1 day earlier, -£8)

06:45+2 - 22:14+2
(travel 2 day later, -£11)

10:12 - 19:43
(travel from Manchester, non-stop, -£9)

BROWSING METHODS, COMPUTER PROGRAM PRODUCTS, SERVERS AND SYSTEMS

CROSS REFERENCE TO RELATED APPLICATIONS

This application claims the priority of PCT/GB2017/051092, filed on Apr. 19, 2017, which claims the benefit of priority to Great Britain Application No. 1606794.4, filed on Apr. 19, 2016, the entire contents of which are fully incorporated herein by reference.

BACKGROUND OF THE INVENTION

1. Field of the Invention

The field of the invention relates to computer user interfaces, and more particularly to methods for searching through databases that contain items with multiple attributes and providing alternative search results for a selected attribute, and to related computer program products, servers and systems.

2. Technical Background

Search is what computers can compute very efficiently through searching databases. A direct outcome from searching is a list of items that match the query. Users often want to find the one right answer for their question: they would like to be convinced that the answer is the best from all possible options. But often users receive hundreds of search results and have no desire to go through all the search results to compare the attributes in which they are interested for each result, and find the best one for them. At the present time, users can perform comparisons with a few tools, but these still are limited in their ability to help a user to find the best result for themself. This applies to any search-based application that helps its users compare the complicated items with multiple attributes: eg. flight itineraries, hotel rooms, car hires, insurance policies, online shopping.

3. Discussion of Related Art

Many online services heavily rely on the concept of "searching"; where (1) the user submits a query with desired conditions about the results, (2) the system matches its database against the given conditions, and then (3-1) returns all the results that meet the conditions and/or (3-2) a best result from the results based on a set of pre-set criteria. This works nicely for simple look-up for a set of simple data, such as querying a contacts list with a name.

However, when it's applied to a dataset with multiple attributes, the major challenge of this approach is that (for 3-1) the user then needs to go through the list of results and compare one against another result for each attribute, or (for 3-2) the user may not have enough confidence in the system in choosing the best result for him/her.

EP1686496B1 discloses that systems and methods are provided for a user interface with an automatic search menu. The interface exposes commands to the user as instantly searchable hierarchy. Visually, this is represented as a tree view with an edit box above it. There is no "Search" or "Go" button to press. One second after any character is entered in the edit box, the computer reduces a displayed hierarchy down to only those items that match the keyword entered. Entering another character before one second expires resets the timer. This allows the user to type in as little or as much of the keyword as necessary to reduce the hierarchy to a few items, one of which can then be mouse-clicked. This method scales to large number of commands.

SUMMARY OF THE INVENTION

According to a first aspect of the invention, there is provided a computer-implemented method of providing a set of alternative search results for a selected attribute among the multiple attributes within the dataset, the method including the steps of:
(i) receiving a search request;
(ii) searching a database to provide a first set of a plurality of search results, each search result including a plurality of attributes;
(iii) identifying a best search result as the initially highlighted result;
(iv) providing the highlighted search result for display;
(v) receiving a selection of an attribute in the highlighted search result;
(vi) providing the set of alternative search results, in which the selected attribute is varied with respect to the highlighted search result, and
(vii) providing the set of alternative search results for display.

An advantage is that a user can use the set of alternative search results to find a result which suits their preferences better than the previously provided best search result, without searching through a list of all the search results which were obtained when searching the database. An advantage is that a user can focus the set of alternative search results to be one based on an attribute they have chosen, which enables the user to focus the set of alternative search results to a criterion which is the criterion most likely to improve the previously provided best search result, in the user's view. The computer implemented method operates in a new way, because it provides the set of alternative search results, in which the selected attribute is varied with respect to the highlighted search result. The perceived problem is overcome by the invention because the computer implemented method provides the set of alternative search results, in which the selected attribute is varied with respect to the highlighted search result.

An initially highlighted result may be an initially selected result.

The method may be one further including the step of:
(viii) receiving a selection of a result in the set of alternative search results, which identifies a new highlighted search result. There is a technical effect on a process which is carried on outside the computer, because a new highlighted search result is selected from outside the computer.

A new highlighted search result may be a new selected search result.

The method may be one in which the new highlighted search result is provided for display, and in which the previous highlighted search result is not provided for display. In an alternative implementation, a separate section of the screen shows the previous highlighted search results as a list so that the user can compare them more easily.

The method may be one in which with every change to the highlighted search result, the user is informed about other related changes caused. An advantage is that the user is better informed.

The method may be one in which the set of alternative search results for display are displayed in a different part of a screen to the highlighted search result.

The method may be one in which the set of alternative search results are sorted in a contextually sensible way for the respective attribute.

The method may be one wherein the method allows the user to easily find the alternatives for each attribute in his/her own priority, knowing the gain or trade-off the alternative will make.

The method may be one in which the set of alternative search results is derived from the first set of search results. An advantage is that a second search does not have to be performed across the whole database.

The method may be one wherein the first set of search results is cached in a cache database. An advantage is quicker access to relevant search results.

The method may be one wherein in steps (vi) and (vii), the selected attribute is used, taking into account preferred or pinned attributes in attribute settings, to filter results in the cached results, and then, taking into account the preferred or the pinned attributes in the attribute settings, the filtered results are sorted, and alternative results based on the selected attribute are provided to the end user. An advantage is quicker access to relevant search results that do not override the user's set preference.

The method may be one wherein the first set of search results is pre-processed to create an interim database. An advantage is quicker access to relevant search results.

The method may be one wherein in the interim database, closely-connected attributes are grouped together. An advantage is fewer number of attributes for users to consider and more relevant search results for each attribute selected by the user for comparison.

The method may be one in which the set of alternative search results for display include, for each alternative search result, for at least one attribute, a difference between the at least one attribute of the alternative search result and the highlighted search result. An advantage is that the user is better informed.

The method may be one wherein when an attribute is selected for variation, a list of results presented in response provides only a price difference for each item in the list. An advantage is that the user is more quickly informed about a relevant search result parameter.

The method may be one wherein the set of alternative search results for display include, for each alternative search result, for a plurality of attributes, differences between the plurality of attributes of the alternative search result and the highlighted search result. An advantage is that the user is better informed.

The method may be one wherein when an attribute is selected for variation, a list of results presented in response provides a plurality of difference fields.

The method may be one wherein displaying differences includes showing highlighted search result fields which differ from the alternative search result as crossed out.

The method may be one wherein the differences are displayed as colour-coded.

The method may be one wherein the differences include a price difference.

The method may be one wherein receiving a selection of an attribute in the highlighted search result includes providing in response a visual emphasis on the attribute in the highlighted search result.

The method may be one wherein receiving a selection of an attribute in the highlighted search result includes detecting the position of a cursor over a data field which is changeable, in response to which there is displayed an indication that the field is indeed changeable by providing an appropriate text, icon or graphic, which when selected, allows a user an option to adjust the data in the field. An advantage is ease of use of obtaining the set of alternative search results.

The method may be one in which a initially highlighted search result is a cheapest result.

The method may be one in which in steps (ii) to (iv), a first search result is displayed before the entire search has been completed. An advantage is a user may start to consider which attribute to vary before the entire search is completed.

The method may be one in which the first search result is updated by one or more subsequent better search results, as the search returns more search results. An advantage is a user may further consider which attribute to vary before the entire search is completed.

The method may be one in which an animated, time-changing icon indicates that a search has not yet completed.

The method may be one in which the animated icon stops changing in time, or disappears from the user interface, to indicate that the search has completed.

The method may be one in which receiving a selection of an attribute in the highlighted search result includes receiving a selection of a group of interdependent attributes in the highlighted search result. An advantage is that the user interface helps a user to avoid considering too many attributes.

The method may be one in which from a highlighted search result, a user can pin or unpin any attributes. An advantage is that the user can better focus the search for the set of alternative search results.

The method may be one in which after changing a field in the highlighted search result, the new field is pinned in the sense that this field value becomes a fixed parameter in the displayed search result. An advantage is that the user interface prevents the system from unexpectedly overriding the user's explicit previous preferences.

The method may be one in which when a field is pinned, the pinning is indicated in the user interface.

The method may be one in which a pinned parameter in the user interface may be unpinned by clicking on the parameter field, such as clicking on a pin icon, in the user interface. An advantage is improved control by the user of the search for the set of alternative search results.

The method may be one in which an unpinned parameter in the user interface may be pinned by clicking on the parameter field, such as clicking on a pin icon, in the user interface. An advantage is improved control by the user of the search for the set of alternative search results.

The method may be one including the step of receiving a selection of a pinning feature so that an attribute can be "locked in" so the user can indicate the attributes which he/she doesn't want to change. An advantage is improved control by the user of the search for the set of alternative search results.

The method may be one in which selection of a pinning feature pins a range of values of an attribute. An advantage is improved control by the user of the search for the set of alternative search results.

The method may be one in which the range of values for each attribute that is pinned is pre-defined or user-defined. An advantage is more reasonable alternative search results that are not overly limited by a selection of a value from a highly constraining attribute or by a selection of a unique value. As an example, selecting the name of a hotel will only show that particular hotel with no other alternatives. By using a pre-defined or user-defined radius from the hotel, the alternative results can also contain nearby hotels.

As an example in flight searching, selecting a departure time may actually select a range of times between 1 hour before and 1 hour after from the selected time. The range can vary depending on the nature of the given attributes.

The method may be one in which pinning affects an algorithm for selecting the representative alternative option, as a search result with a different option for the pinned attributes will be excluded from the process of selecting the alternative options, or computationally tagged to indicate such nature that the result contains one or more conflicting value to the user's preference. An advantage is improved control by the user of the search for the set of alternative search results.

The method may be one in which alternative options which meet pinning criteria are displayed more prominently.

The method may be one in which alternative options which do not meet pinning criteria are displayed less prominently.

The method may be one in which selecting a search result results in the selected attribute of step (v) being pinned automatically. An advantage is ease of use of obtaining the set of alternative search results.

The method may be one in which selecting a search result which does not meet a pinned criterion results in that pinned criterion being unpinned automatically. An advantage is ease of use of obtaining the set of alternative search results.

The method may be one in which results provided for display are provided for display on a screen of a mobile device.

The method may be one in which results provided for display are provided for display on a screen of a desktop device. This can work also on a TV (e.g. as in, IPTV) or on a wrist watch (as in, e.g. Smart Watches), or on a laptop or tablet computer.

The method may be one in which alternative search results provided for display are scrollable in a portion of a screen. An advantage is that when there are too many results to be displayed, the results can be viewed, but without losing the displayed highlighted search result so that the user can compare the alternative options to the value on the highlighted result.

The method may be one in which there are displayed user selectable forward and back buttons, so the user may move between the currently highlighted search result and previously highlighted search results.

The method may be one wherein the range of values is a range of values of flight durations, which are the same or lesser duration, compared to the duration of the highlighted search result.

The method may be one wherein the range of values is a range of values of flight durations, which are less than the current duration plus an acceptable difference of the highlighted search result.

The method may be one wherein the range of values is a range of values of
  Time (eg. take-off/landing/check-in/check-out/pick-up/drop-off/etc.): e.g. +/−1 hour window; or
  Locations (eg. airports/hotel address/car hire points/etc.): e.g. 1 km radius on map; or
  Quality (eg. cabin class/room type/hotel rating/etc.): e.g. the selected quality or better quality).

The method may be one wherein the search request relates to flights, hotels, travel insurance or car hire.

The method may be one wherein the search request relates to flights.

The method may be one in which a flight search request is a search for one-way or return flights from a named city or airport to a named city or airport, and includes dates or date ranges for the flight leg or the flight legs.

The method may be one wherein when a city is designated, the search includes all the airports associated with that city, or all airports within a predefined, or user-defined, distance of the designated city. A predefined hierarchy may be used to determine any multiple airports that belong to a city, unrelated to their distance from the city. This may be an imperfect solution when a city has a closer airport to it that belongs to a neighboring city, while it has a further away airport that belongs to the city itself; but each city may decide how to be represented with respect to airports. Showing alternative airports by distance from the city is provided, in an example.

The method may be one in which a search result for an outbound flight leg includes start airport, destination airport, take-off time, landing time, flight duration, airline name, and number of stops.

The method may be one in which a search result for an outbound flight leg includes
  Marketing airline (the airline company which sells the ticket under their brand), or
  Operating airline (the airline company which operates the route with their aircraft), or
  Ticket provider (airline company or travel agency), or
  Cabin class, or
  Stopover airports.

The method may be one in which a search result for an inbound flight leg includes start airport, destination airport, take-off time, landing time, flight duration, airline name, and number of stops.

The method may be one in which a search result for an inbound flight leg includes
  Marketing airline (the airline company which sells the ticket under their brand), or
  Operating airline (the airline company which operates the route with their aircraft), or
  Ticket provider (airline company or travel agency), or
  Cabin class, or
  Stopover airports.

The method may be one in which an attribute is a number of stops in a flight leg, a flight leg departure time, a flight leg landing time, a flight leg duration, or a flight carrier.

The method may be one in which an attribute is a
  Marketing airline (the airline company which sells the ticket under their brand), or
  Operating airline (the airline company which operates the route with their aircraft), or
  Ticket provider (airline company or travel agency), or
  Cabin class, or
  Stopover airports.

The method may be one in which when an airport in a city with multiple airports is selected as a departure or arrival airport, a list of available alternative airports is shown.

The method may be one in which when an airport in a city with multiple airports is selected as a departure or arrival airport, instead of showing a list of available alternative airports, the available alternative airports are shown on a map.

The method may be one in which it is possible to group take-off time, landing time and duration as the closely-connected attributes, because if a user changes one of these parameters, the rest will change accordingly.

The method may be one in which, after having determined their preferred search result, following interaction with the user interface, a user may make a final selection of the preferred search result, and proceed to booking and payment.

According to a second aspect of the invention, there is provided a computer program product executable on a processor to provide a set of alternative search results, the computer program product executable to:
(i) receive a search request;
(ii) search a database to provide a first set of a plurality of search results, each search result including a plurality of attributes;
(iii) identify a best search result as the initially highlighted search result;
(iv) provide the highlighted search result for display;
(v) receive a selection of an attribute in the highlighted search result;
(vi) provide the set of alternative search results, in which the selected attribute is varied with respect to the highlighted search result, and
(vii) provide the set of alternative search results for display.

The computer program product may be executable to perform a method of any aspect according to a first aspect of the invention.

According to a third aspect of the invention, there is provided a server programmed to:
(i) receive a search request;
(ii) search a database to provide a first set of a plurality of search results, each search result including a plurality of attributes;
(iii) identify a best search result as the initially highlighted search result;
(iv) provide the highlighted search result to the client computer;
(v) receive a selection of an attribute in the highlighted search result;
(vi) provide the set of alternative search results, in which the selected attribute is varied with respect to the highlighted search result, and
(vii) provide the set of alternative search results to the client computer.

The server may be further programmed to perform a method of any aspect according to a first aspect of the invention.

According to a fourth aspect of the invention, there is provided a system comprising a server and a computer in communication with the server, the computer including a display, wherein:
(i) the computer is programmed to receive a search request, and to communicate the request to the server;
(ii) the server is programmed to search a database to provide a first set of a plurality of search results, each search result including a plurality of attributes;
(iii) the server is programmed to identify a best search result as the initially highlighted search result;
(iv) the server is programmed to provide the highlighted search result to the computer, for display on the computer display;
(v) the computer is programmed to receive a selection of an attribute in the highlighted search result, and to communicate the selection to the server;
(vi) the server is programmed to provide the set of alternative search results, in which the selected attribute is varied with respect to the highlighted search result, and
(vii) the server is programmed to provide the set of alternative search results to the computer, for display on the computer display.

The system may be further programmed to perform a method of any aspect according to a first aspect of the invention.

According to a fifth aspect of the invention, there is provided a computer programmed to receive a search request, and in response to provide for display a highlighted search result comprising multiple attributes, wherein the highlighted search result comprising multiple attributes provides a search menu for obtaining further search results. An advantage is that a user can use the search menu to find a result which suits their preferences better than the previously highlighted search result, without searching through a list of all the search results which were obtained when searching a database. An advantage is that a user can focus the next search to be one based on an attribute they have chosen, which enables the user to focus the next search to a criterion which is the criterion most likely to improve the highlighted search result over the previously highlighted search result, in the user's view. A computer thus programmed operates in a new way, because it highlights a search result comprising multiple attributes which provides a search menu for obtaining further search results. The perceived problem is overcome by the invention because the computer highlight a search result comprising multiple attributes which provides a search menu for obtaining further search results.

The computer may be one in which in response to a selection of an attribute of the highlighted search result there is provided for display a plurality of search results relating to variation of the selected search result attribute with respect to the highlighted search result.

The computer may be one in which the computer is a server, a mobile device, or a desktop device.

According to a sixth aspect of the invention, there is provided a computer program product executable on a computer to receive a search request, and in response to provide for display a highlighted search result comprising multiple attributes, wherein the highlighted search result comprising multiple attributes provides a search menu for obtaining further search results.

The computer program product may be one in which in response to a selection of an attribute of the highlighted search result there is provided for display a plurality of search results relating to variation of the selected search result attribute with respect to the highlighted search result.

The computer program product may be one in which the computer is a server, a mobile device, or a desktop device.

In the above first to sixth aspects of the invention, search results may be travel-related search results, a search request may be a travel-related search request, and a search result may be a travel-related search result.

According to a further aspect of the invention, there is provided a computer-implemented method of providing a set of alternative search results, the method including the steps of:
(i) receiving a search request;
(ii) searching a database to provide a first set of a plurality of search results, each search result including a plurality of attributes;
(iii) identifying a best search result as the initially highlighted search result;
(iv) providing the highlighted search result for display;
(v) receiving a selection of an attribute in the highlighted search result;
(vi) providing the set of alternative search results, in which the selected attribute is varied with respect to the highlighted search result, and (vii) providing the set of alternative search results for display.

According to a further aspect of the invention, there is provided a computer program product executable on a processor to provide a set of alternative search results, the computer program product executable to:
(i) receive a search request;
(ii) search a database to provide a first set of a plurality of search results, each search result including a plurality of attributes;
(iii) identify a best search result as the initially highlighted search result, (iv) provide the highlighted search result for display;
(v) receive a selection of an attribute in the highlighted search result;
(vi) provide the set of alternative search results, in which the selected attribute is varied with respect to the highlighted search result, and
(vii) provide the set of alternative search results for display.

According to a further aspect of the invention, there is provided a server programmed to:
(i) receive a search request;
(ii) search a database to provide a first set of a plurality of search results, each search result including a plurality of attributes;
(iii) identify a best search result as the initially highlighted search result;
(iv) provide the highlighted search result to the client computer;
(v) receive a selection of an attribute in the highlighted search result;
(vi) provide the set of alternative search results, in which the selected attribute is varied with respect to the highlighted search result, and
(vii) provide the set of alternative search results to the client computer.

According to a further aspect of the invention, there is provided a system comprising a server and a computer in communication with the server, the computer including a display, wherein:
(i) the computer is programmed to receive a search request, and to communicate the request to the server;
(ii) the server is programmed to search a database to provide a first set of a plurality of search results, each search result including a plurality of attributes;
(iii) the server is programmed to identify a best search result as the initially highlighted search result;
(iv) the server is programmed to provide the highlighted search result to the computer, for display on the computer display;
(v) the computer is programmed to receive a selection of an attribute in the highlighted search result, and to communicate the selection to the server;
(vi) the server is programmed to provide the set of alternative search results, in which the selected attribute is varied with respect to the highlighted search result, and
(vii) the server is programmed to provide the set of alternative search results to the computer, for display on the computer display.

Aspects of the invention may be combined.

BRIEF DESCRIPTION OF THE FIGURES

Aspects of the invention will now be described, by way of example(s), with reference to the following Figures, in which:

FIG. 1 shows an example of a highlighted search return flight result between the city of London, UK and the city of New York, N.Y., USA.

FIG. 3 shows an example which includes comparative flight information for a non-stop flight when compared to a one stop flight.

FIG. 5 shows an example which shows different available departure times on the right hand side of the screen.

FIG. 6 shows an example in which the list of departure times has been scrolled compared to the list in FIG. 5.

FIG. 7 shows an example which includes comparative flight information for a shorter duration inbound flight leg when compared to the currently selected inbound flight leg.

FIG. 8 shows an example which shows different available carriers for the outbound flight leg on the right hand side of the screen.

FIG. 9 shows an example of a screen output corresponding to a pinned arrival time for an outbound leg.

FIG. 10 shows an example in which the flight carrier of an outbound flight leg is selected for variation.

FIG. 11 shows an example in which the flight carrier of an outbound flight leg is selected for variation.

FIG. 12 shows an example user interface, in which when a city name is selected as an arrival airport, a list of available airports is shown.

Figure 13:
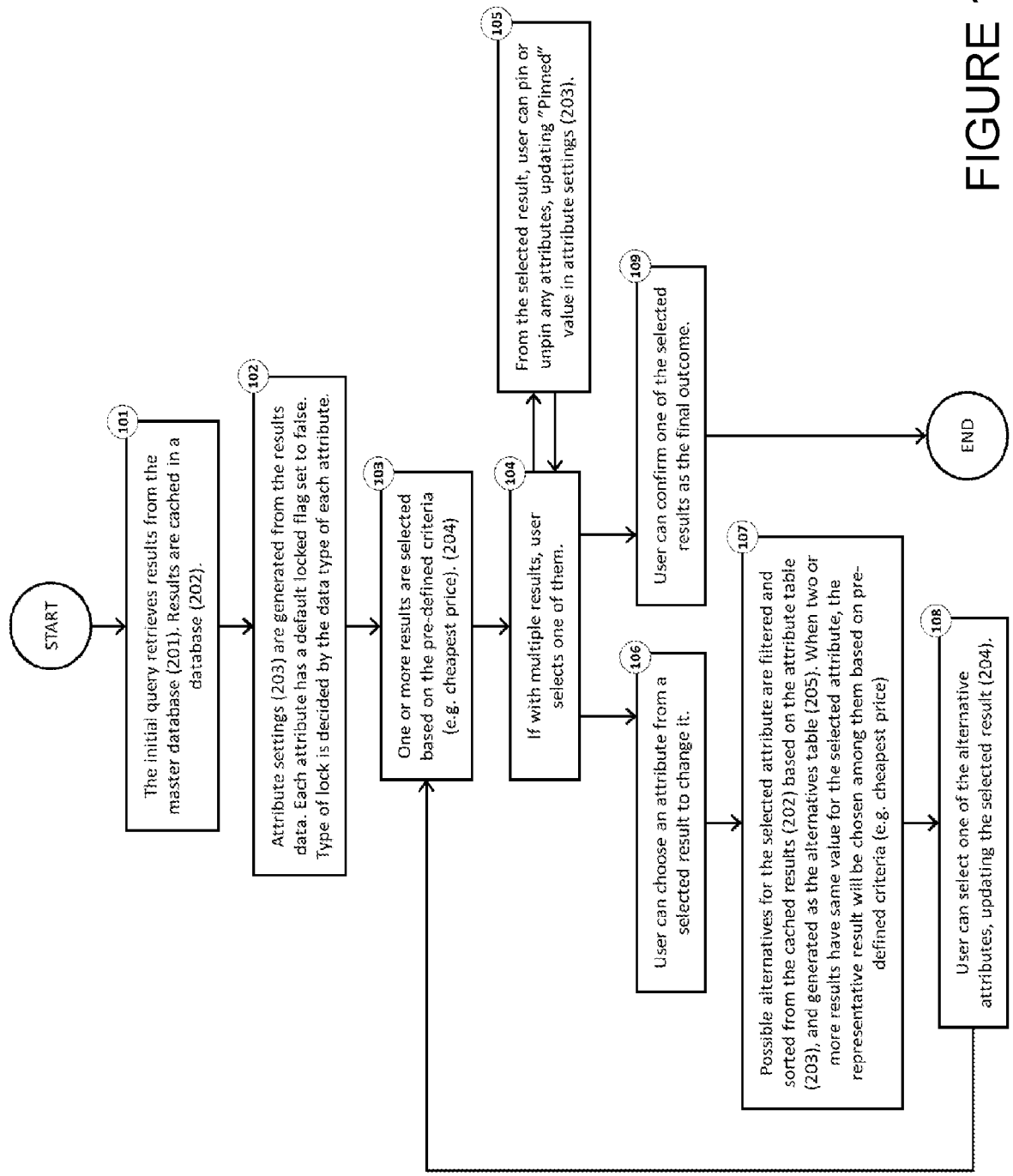

An overview of an example search algorithm is provided in FIG. 13.

Examples of data tables which relate to an example flight search are shown in FIG. 14.

Figure 15:
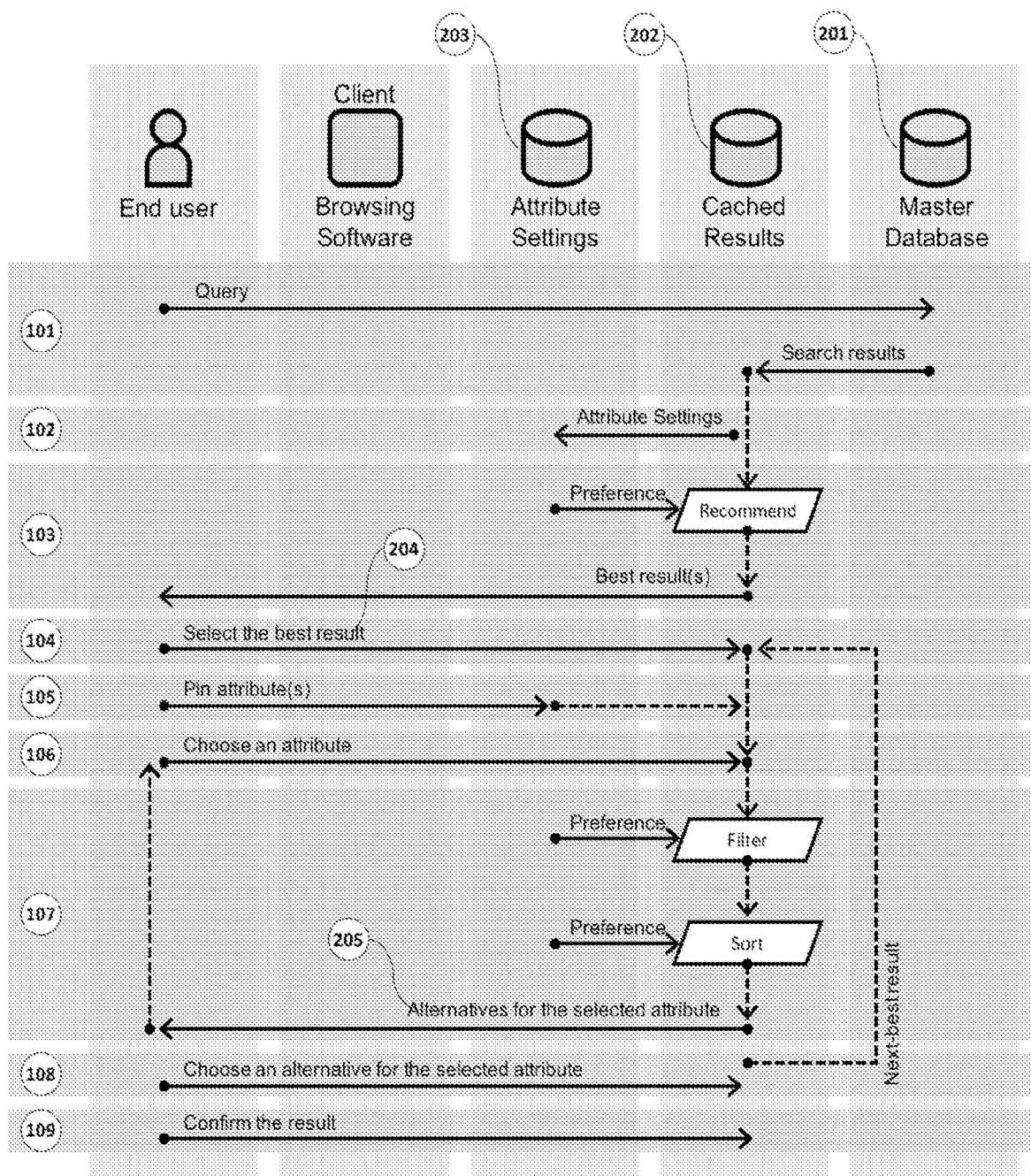

FIG. 15 shows an example sequence diagram, which may relate to the data tables of FIG. 14, and which may relate to the example search algorithm provided in FIG. 13.

Figure 16:
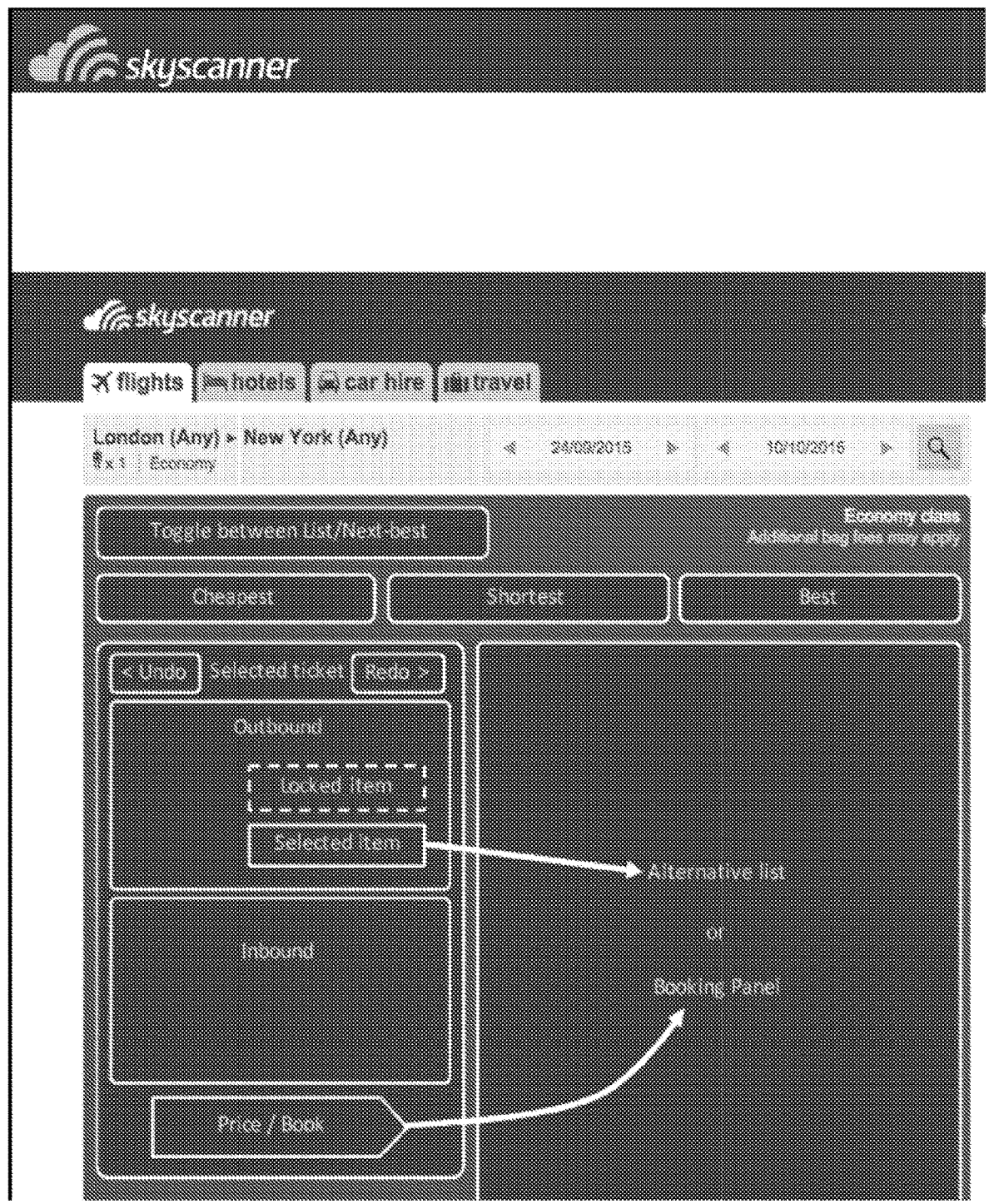

FIG. 16 shows an example in which a search may be provided for one or more of: flights, hotels, car hire and travel.

Figure 17:
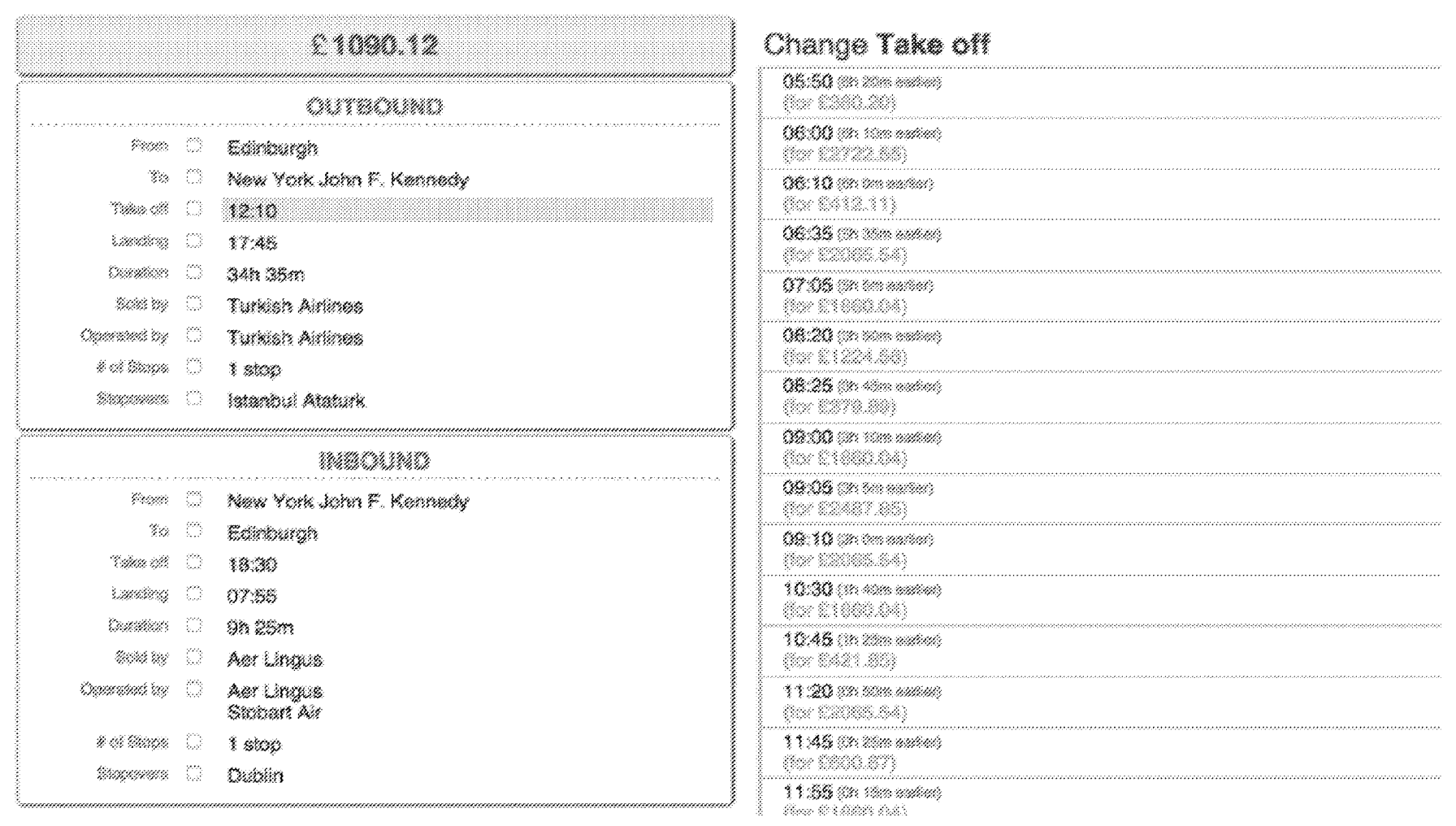

FIG. 17 shows an example user interface for searching in which an attribute (take off time) of a search result has been selected in the left hand side of the screen, in response to which search results have been provided in the right hand side of the screen relating to different take off times, in chronological order.

FIG. 18 shows an example user interface for searching in which a search result has been provided in the left hand side of the screen, in response to which search results have been provided in the right hand side of the screen which relate to the search result in the left hand side of the screen.

Figure 19:

FIG. 19 shows an example in which when the user moves a cursor over a data field which is changeable (here, the outbound leg arrival airport), the user interface indicates in response that the field is indeed changeable by providing the appropriate text "CHANGE", which when selected, allows a user an option to adjust the data in the field.

Figure 20:
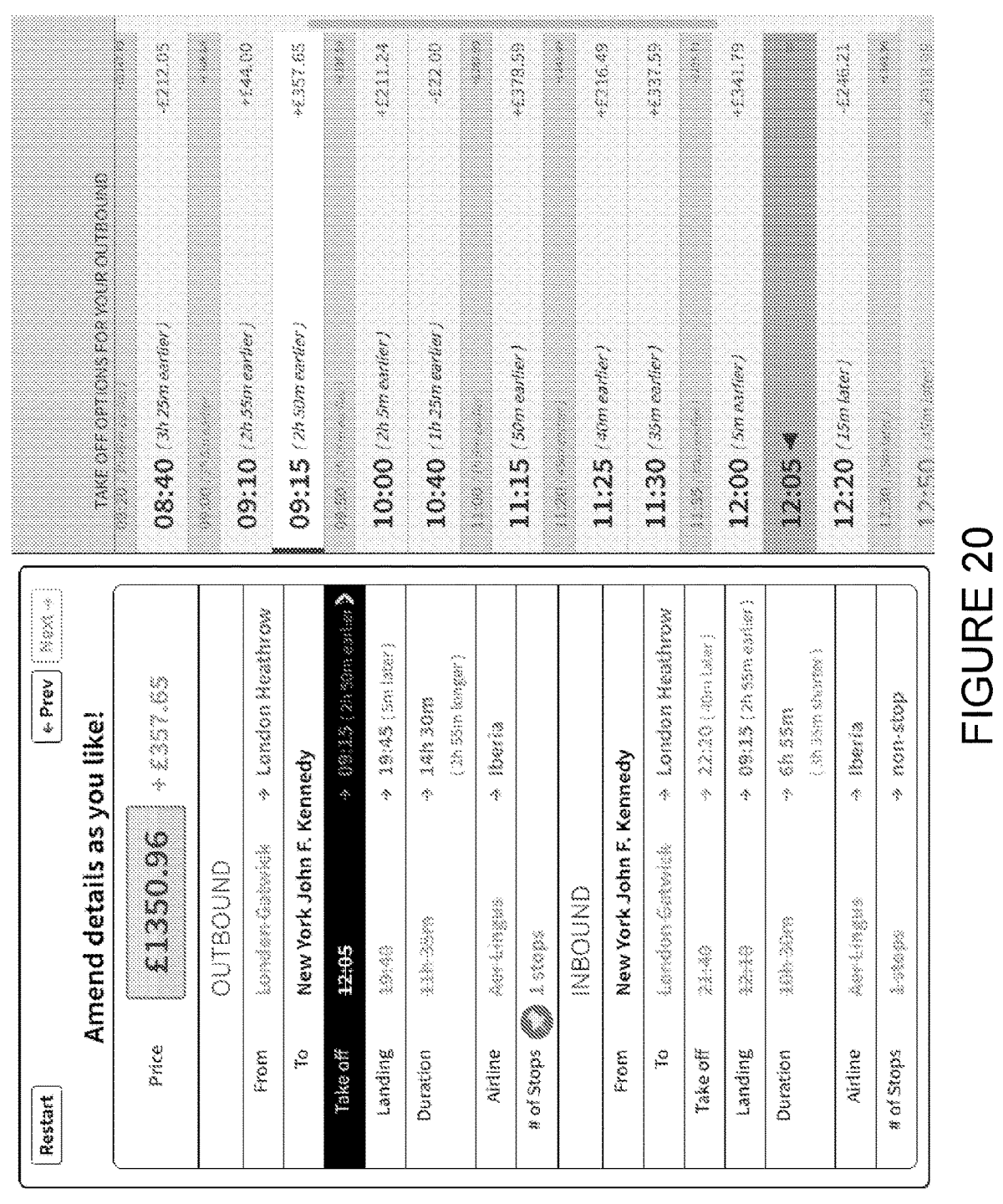

FIG. 20 shows an example which includes comparative flight information for a one-stop earlier outbound leg departure time flight when compared to a one-stop later outbound leg departure time flight.

DETAILED DESCRIPTION

An original search result record may include multiple attributes (e.g. in the flight context departure airport, destination, departure time, arrival time, date, airline, class, number of stops, price etc). If the user selects or highlights any one specific attribute (e.g. departure time) then the user interface (UI) may display one or more different new search results, each with a value for that specific attribute (e.g. departure time) that is different from the value in the original search result record (e.g. different departure times).

Each new search result can have other attributes (e.g. departure airport, destination, date, class) that match those of the original search result record and one or more attributes (e.g. price, airline, class) that do not match those of the original search result record; if for a specific new search result any attribute(s) differs from those of the original search result record, then the UI displays the new value and/or its difference (e.g. new price, new airline, new class) to enable the user to understand the impact of selecting that new search result.

The approach is applicable generally wherever search results of any sort (e.g. flights, hotels, car hire etc) have multiple attributes and it is helpful for a user to be able to isolate just one attribute and understand the consequences of altering just that one attribute.

An original search result record may include multiple attributes (e.g. in the flight context departure airport, destination, departure time, arrival time, date, airline, class, number of stops, price etc). If the user selects or highlights any one specific attribute (e.g. departure time) or group of interdependent attributes (e.g. times; including departure/landing time as well as duration) then the UI may display one or more different new search results, each representing an alternative option for that specific attribute (e.g. departure time) that is different from the value in the original search result record (e.g. different departure times). Each representative alternative result is selected from the results that have the same option (e.g. within +/-1 hour of 09:30) for the selected attribute (e.g. departure time) based on a set of programmatic criteria (e.g. cheapest price).

Each representative alternative result can have one or more attributes (e.g. departure airport, destination, date, class) that match those of the original search result record, and other one or more attributes (e.g. price, airline, class) that do not match those of the original search result record; if for a specific representative alternative result any attribute(s) differs from those of the original search result record, then the UI displays the new value or difference (e.g. new price, new airline, new class) to enable the user to understand the impact of selecting that new search result.

Figure 10:
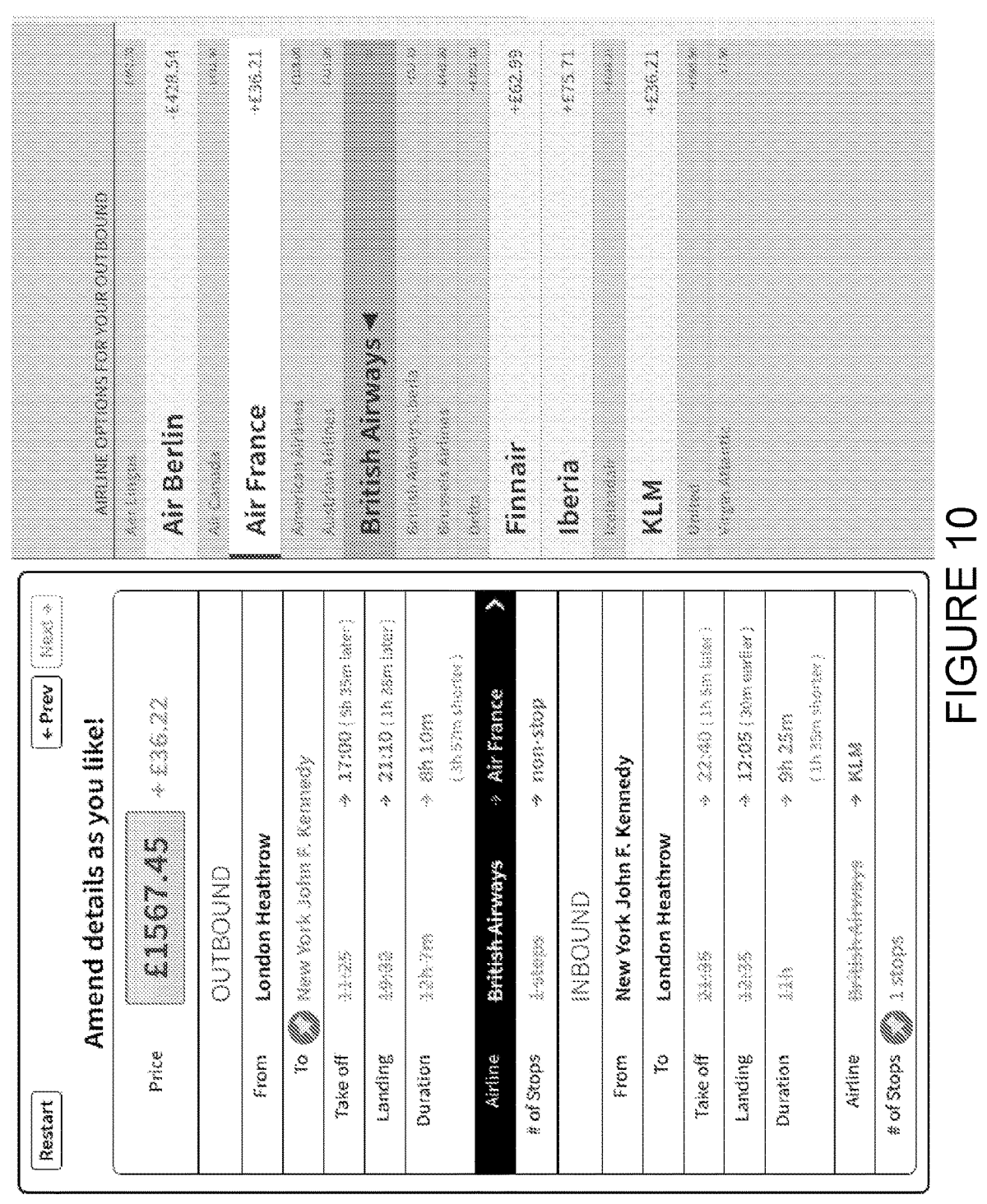
Figure 11:
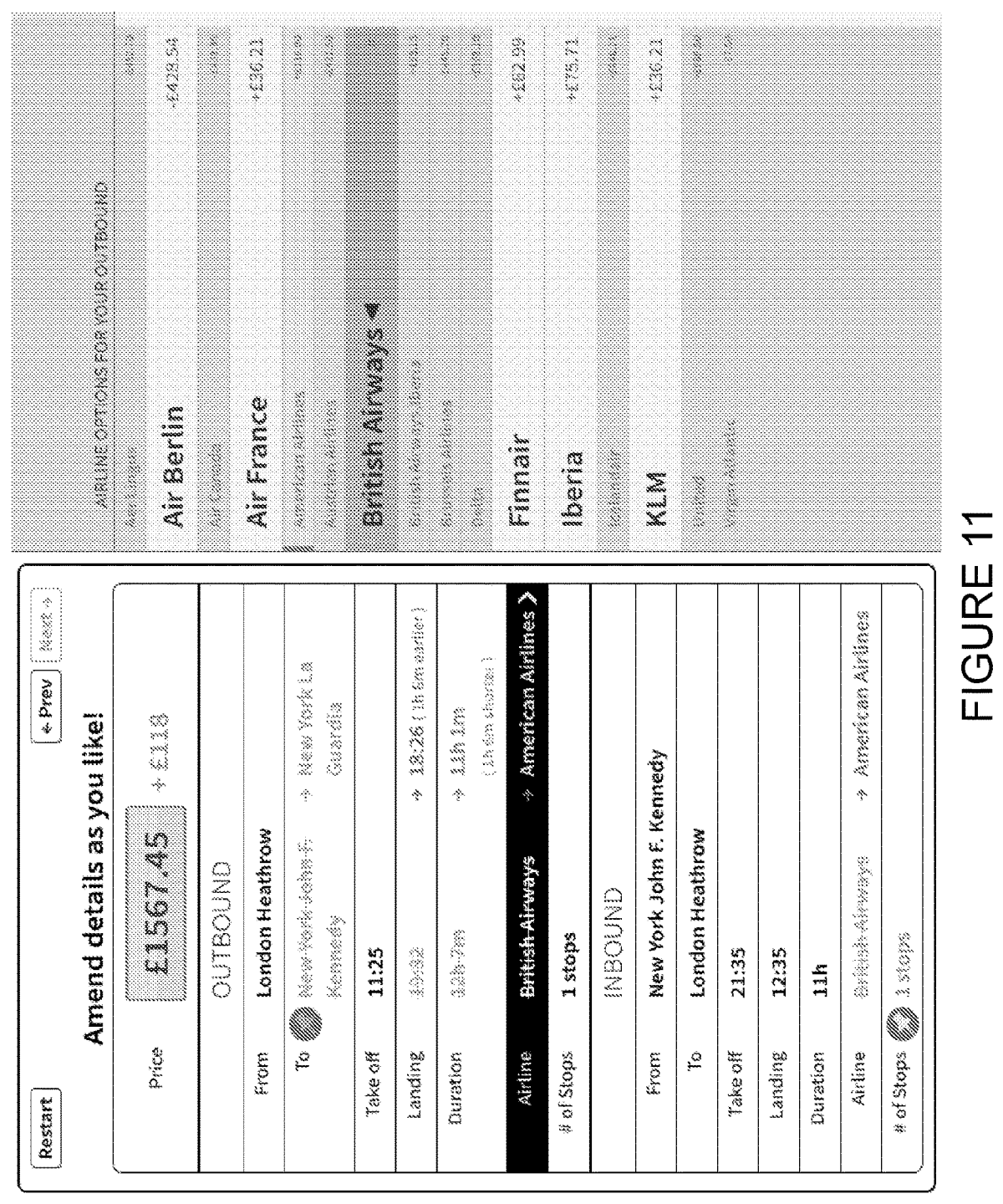

And on top of this, there are pinning features so that the user can "lock in" the attributes which he/she doesn't want to change. Pinning affects the algorithm of selecting the representative alternative option, as the result with a different option for the locked-in attributes will be excluded from the process of selecting the alternative option, or visually marked to indicate such nature. (In an example, those alternatives that are not available without changing locked-in values are shown as de-emphasized items eg. on the right hand panel. Examples are shown in FIGS. 10 and 11.)

We now provide some typical examples of user interactions with an example system which relates to aspects of the invention.

In an example, a user performs a search for one-way or return flights from a named city or airport to a named city or airport, such as by entering into a user interface a start city or airport, a destination city or airport, and dates for the flight legs, or date ranges for the flight legs. The user interface may be on a mobile device, such as in an app of a mobile device, or in a web browser interface of a mobile device. A mobile device may be a smartphone or a tablet computer. The user interface may be on a desktop device, such as in an app of a desktop device, or in a web browser interface of a desktop device. When a city is designated, the search may include all the airports associated with that city, or all airports within a predefined (or user defined) distance of the designated city.

The user interface may show a particular result which has been selected from the search results. In an example, the system selects the cheapest flight and displays the corresponding search result. In an example, a start city and a destination city are specified in a search. In response the system selects the cheapest flight (including outbound and inbound legs) between any airport in the start city and any airport in the destination city, and displays the corresponding search result. A first search result may be displayed before the entire search has been completed. The first search result may be updated by one or more subsequent better (eg. cheaper) flight search results, as the search returns more flight search results. The search result display may include a price, an outbound flight leg and an inbound flight leg, of the current best (eg. cheapest) search result, until a final search result is displayed, in a similar format. The search result for an outbound flight leg may display start airport, destination airport, take-off time, landing time, flight duration, airline name, and number of stops. The search result for an inbound flight leg may display start airport, destination airport, take-off time, landing time, flight duration, airline name, and number of stops. An animated, time-changing icon may indicate that a search has not yet completed. The animated icon may stop changing in time, or disappear from the user interface, to indicate that the search has completed. An example of a best search return flight result between the city of London, UK and the city of New York, N.Y., USA is shown in FIG. 1.

A final search result, which is determined by being the cheapest flight, will be the cheapest flight. But such a result may have some disadvantages for a traveller, such as having a very early take off time, or such as having a long stop over at a connecting airport which leads to a long journey time. So the cheapest flight may be an inconvenient flight for a traveller. Another possible disadvantage for a traveller is that one or more of the four airports (outbound start airport, outbound destination airport, inbound start airport, inbound destination airport) may be inconvenient for the traveller. For example, a traveller whose ultimate destination is on the far south side of a large city may wish to avoid using an airport that is on the far north side of the city. Or for example a traveller may have a dislike of a particular airport for some reason eg. inconvenient access from the nearest city, such as due to frequent traffic jams. Another possible disadvantage for the traveller is that the outbound destination airport and the inbound start airport might be different, which the traveller needs to remember, or they are likely to miss their inbound flight.

Figure 2:
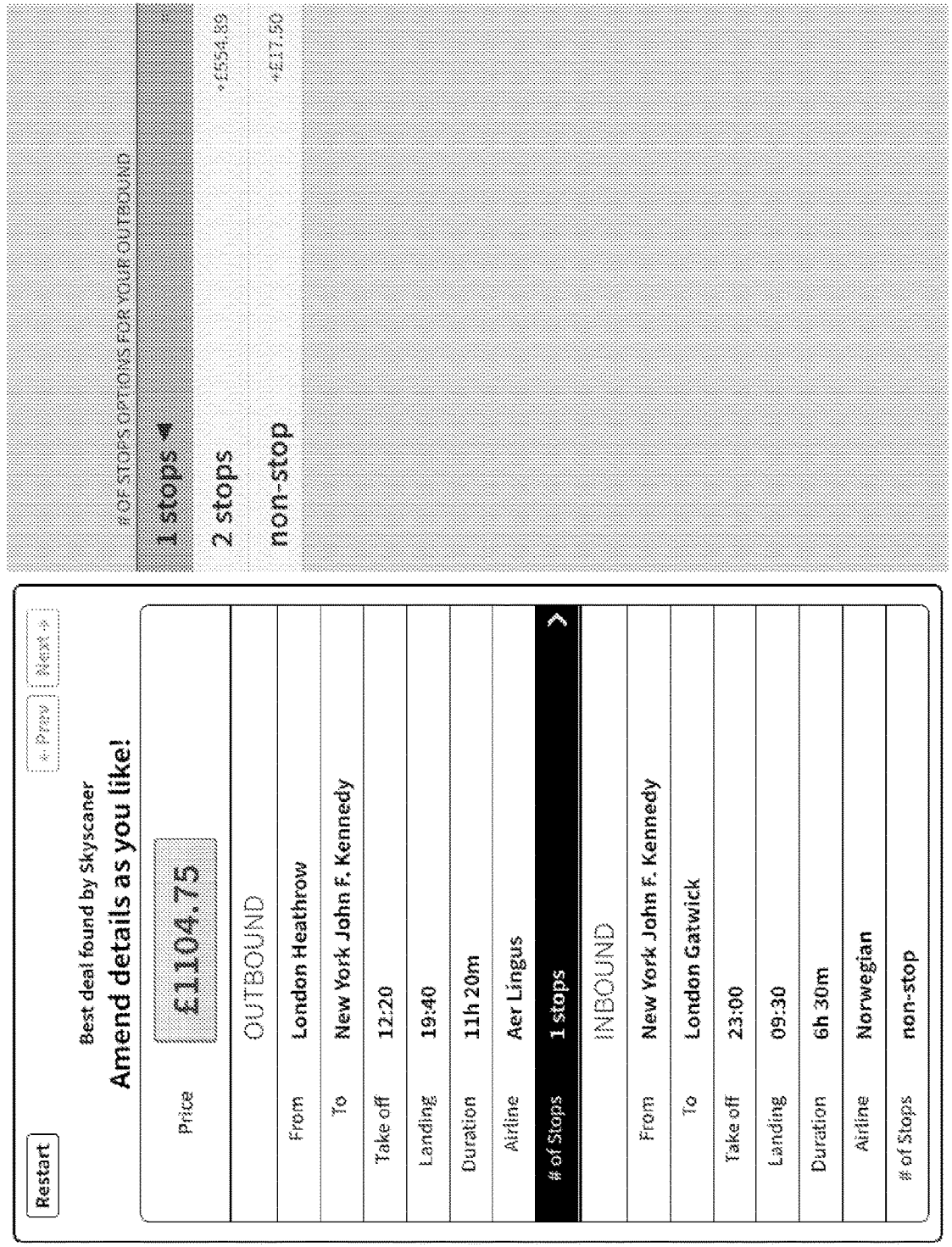
FIG. 2 shows an example in which the user interface displays the available selectable options for the number of stops in the outbound flight (eg. non-stop, 1 stop, 2 stops), in a different part of the screen to the original flight information.

The user may begin looking for a flight which they prefer to the cheapest flight, by interacting with the user interface. When the user moves a cursor over a data field which is changeable (eg. the number of stops for a flight leg), the user interface may indicate in response that the field is indeed changeable by providing an appropriate text, icon or graphic, such as "CHANGE", which when selected, allows a user an option to adjust the data in the field. An example is shown in FIG. 19. For example, a user may decide to look for direct outbound flight legs. The user selects (eg. clicks on) the number of stops for the outbound flight leg. In response, the user interface displays the available selectable options for the number of stops in the outbound flight (eg. non-stop, 1 stop, 2 stops), in a different part of the screen to the original flight information, for example together with the price difference compared to the currently selected flight. An example is shown in FIG. 2.

Figure 3:
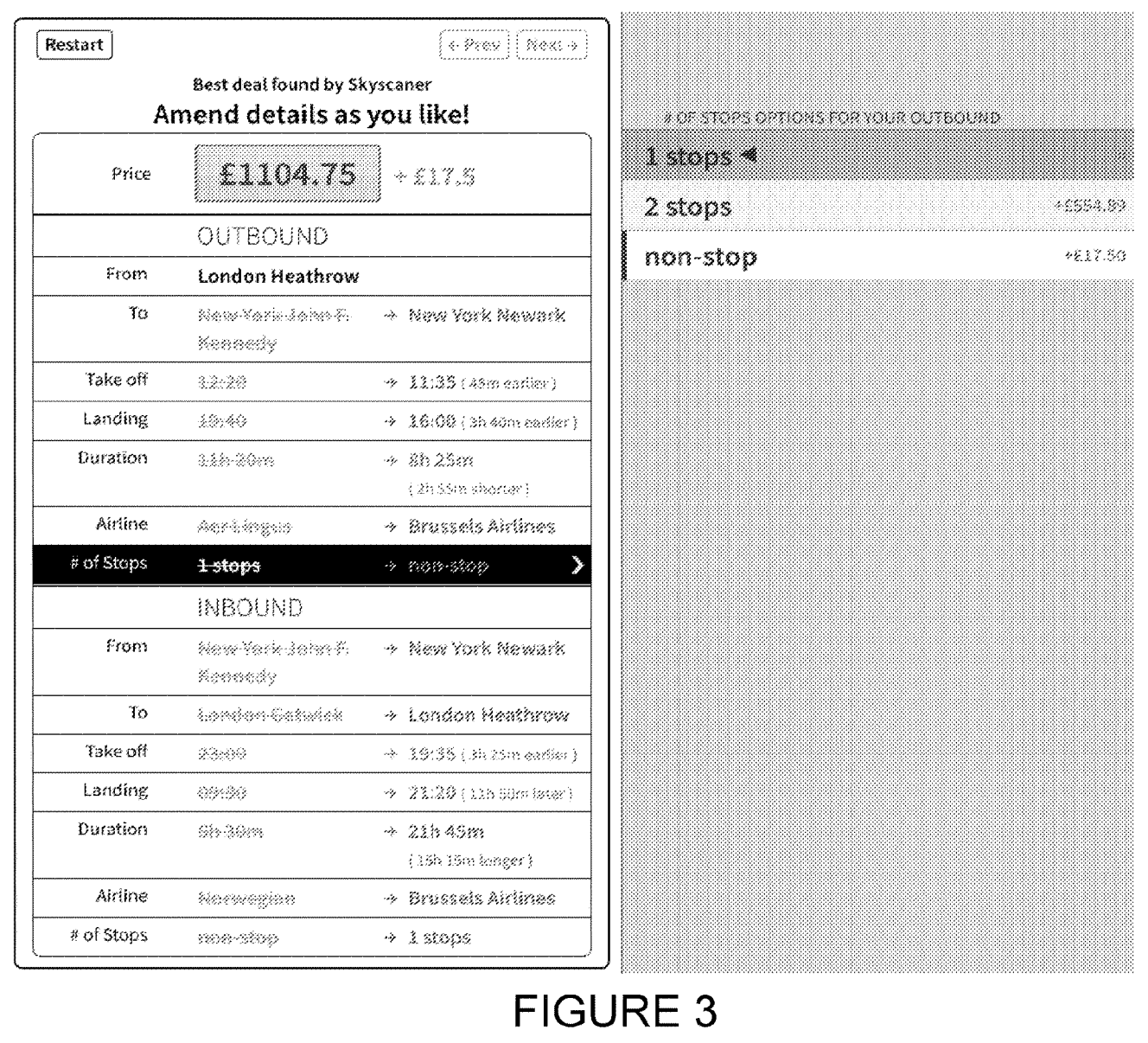

When the user identifies (eg. brings their cursor over) a selectable option for the number of stops in the outbound flight leg, which is different to the number of stops in the original flight leg, the user interface may display comparative flight information, which is the flight information for the cheapest flight for the selectable option for the number of stops in the outbound flight, which is different to the number of stops in the original flight, and the differences between data fields for that flight and the currently selected flight. For example, if the original one stop flight was $500 and the new non-stop flight is $530, the interface may display the original price as $500, with +$30 indicated as the price difference. Or for example, if the original one stop flight was $500 and the new non-stop flight is $530, the interface may display the new price as $530, with +$30 indicated as the price difference. A data field or data field difference may be colour coded, such as to express whether the difference is a negative one (eg. red for more expensive), neutral (eg. amber for low importance such as a 15 minute change in departure time), or green for a positive one (eg. flight duration shortened, such as from 10 hours to 7 hours, which may be indicated as "7 hours (3 hours shorter)" for example. An example which includes comparative flight information for a non-stop flight when compared to a one stop flight is shown in FIG. 3.

A user may select the non-stop option, for example if the additional cost is only quite small (eg. an extra $30 on a $500 flight) compared to a one stop option. Upon selection of the non-stop flight leg option, the user interface may update to present only the flight information of the new flight which includes the non-stop flight leg.

Figure 4:
FIG. 4 shows an example in which the number of stops in the outbound leg has been pinned at non-stop, which is indicated by a pin icon.

After changing a field in the search, such as selecting a non-stop option when the original search result provided a one stop result, the new field may be pinned in the sense that this becomes a fixed parameter in the displayed search result. When a field is pinned, the pinning may be indicated in the user interface, by displaying an icon for example. When the user returns to the displayed search result interface, the new search result corresponding to the pinned parameter may be displayed. An example is shown in FIG. 4, in which the number of stops in the outbound leg has been pinned at non-stop, which is indicated by a pin icon.

A pinned parameter in the user interface may be unpinned by clicking on the parameter, such as clicking on a pin icon, in the user interface. An unpinned parameter in the user interface may be pinned by clicking on the parameter, such as clicking on a pin icon, in the user interface.

The user may begin looking for a flight which they prefer to the currently selected flight, by interacting with the user interface. For example, a user may decide to look for later departing outbound flight legs. The user selects (eg. clicks on) the departure time for the outbound flight leg. In response, the user interface displays the available selectable options for the departure times in the outbound flight legs (eg. earlier times or later times), in a different part of the screen to the original flight information, such as in a list, for example together with the price difference compared to the currently selected flight.

Flights which meet the current pinning criteria (eg. non-stop is pinned) may be displayed more prominently (eg. in larger bolder font) than other flights. The currently selected flight leg may be highlighted. Flights which do not meet the current pinning criteria (eg. non-stop is pinned) may be displayed less prominently (eg. in small grey font); such flights which do not meet the current pinning criteria may be selected, but any such selection may result in one or more of the pinning criteria being unpinned automatically; that is, a previous selection may need to be overridden. If a different departure time is selected for the outbound leg, that departure time may be pinned for the outbound leg.

Figure 5:
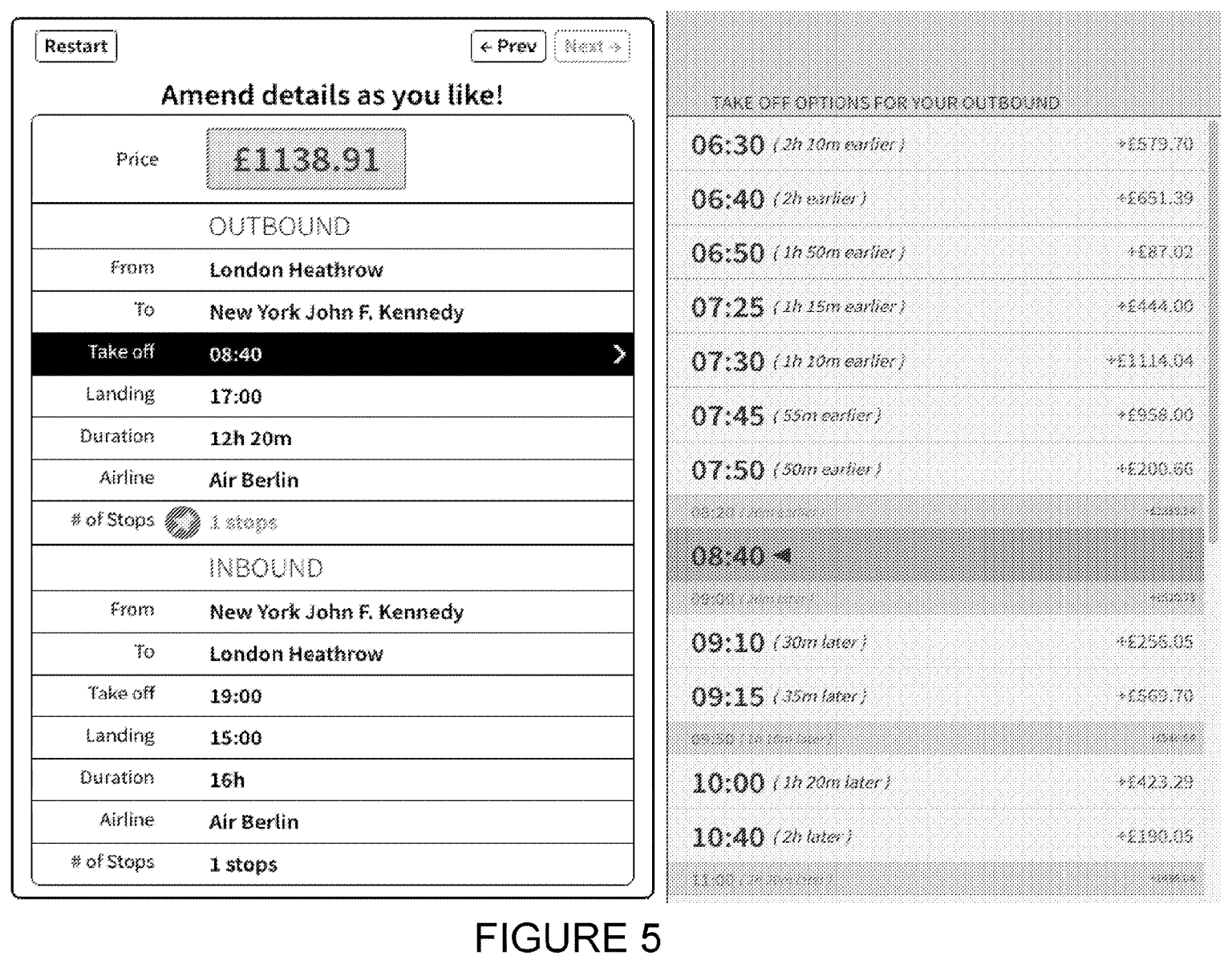
Figure 6:
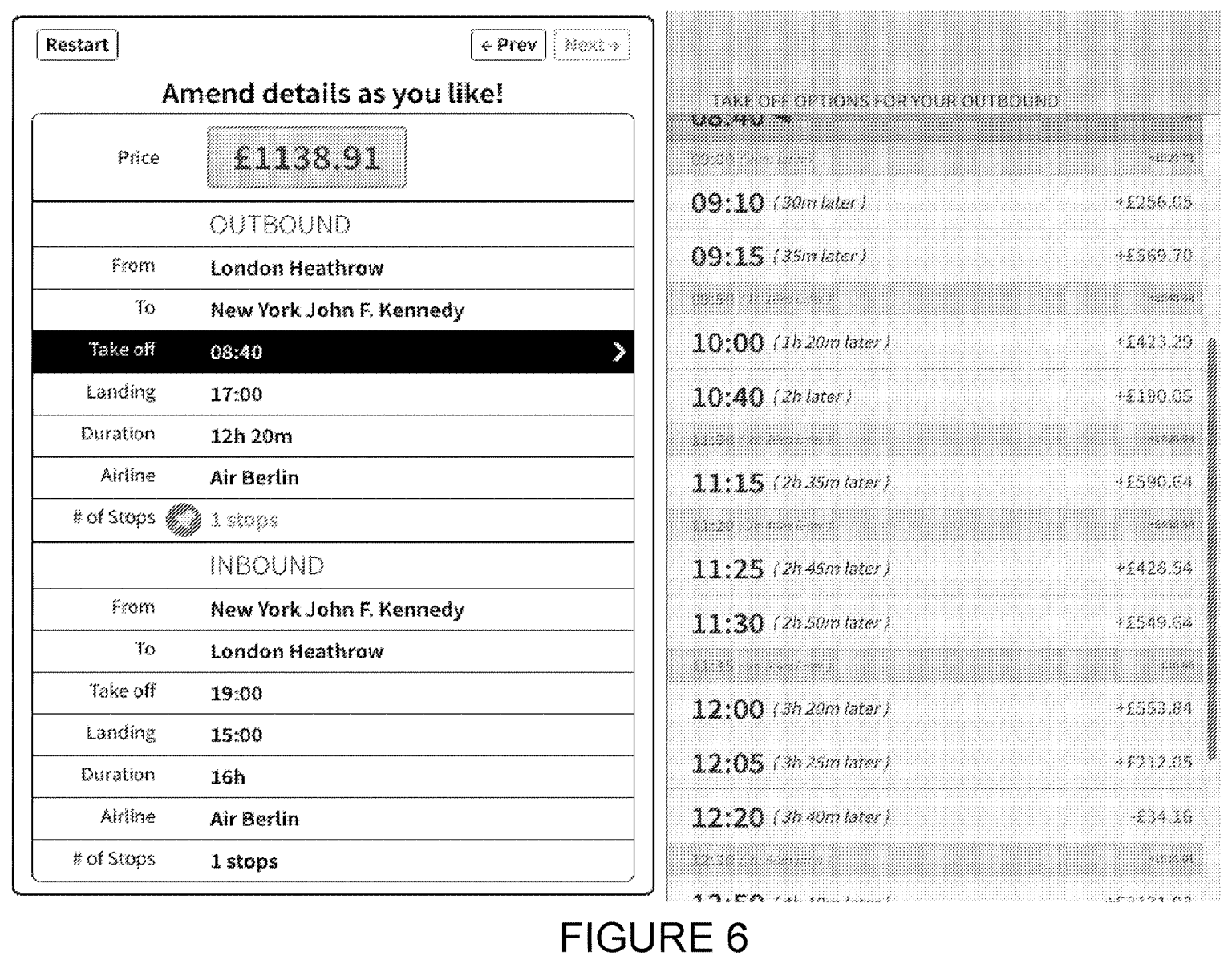

An example which shows different available departure times on the right hand side of the screen is shown in FIG. 5. A list of different departure times may be scrollable, so as to provide more departure times. An example in which the list of departure times has been scrolled compared to the list in FIG. 5 is shown in FIG. 6.

In effect, a presented search result comprising multiple attributes (eg. outbound start airport, outbound destination airport, departure time, landing time, flight duration, airline, number of stops) has become a search menu for obtaining further search results. This is because selecting a search result attribute, such as a departure time, then provides a list of search results, for example the list comprising different departure times.

When the user identifies (eg. brings their cursor over) a selectable option for a different departure time for a non-stop outbound flight leg, the user interface may display comparative flight information, which is the flight information for the flight for the selectable option for the different departure time for the outbound flight leg, which is different to the departure time in the original non-stop outbound flight leg, and the differences between data fields for the two flights. For example, if the original non-stop stop flight was $530 and the new flight with a non-stop outbound flight leg with a 90 minute later departure time is $630, the interface may display the original price as $530, with +$100 indicated as the price difference. A data field or data field difference may be colour coded, as explained above, for example. An example which includes comparative flight information for a one-stop earlier departure time flight when compared to a one-stop later departure time flight is shown in FIG. 20.

Figure 7:
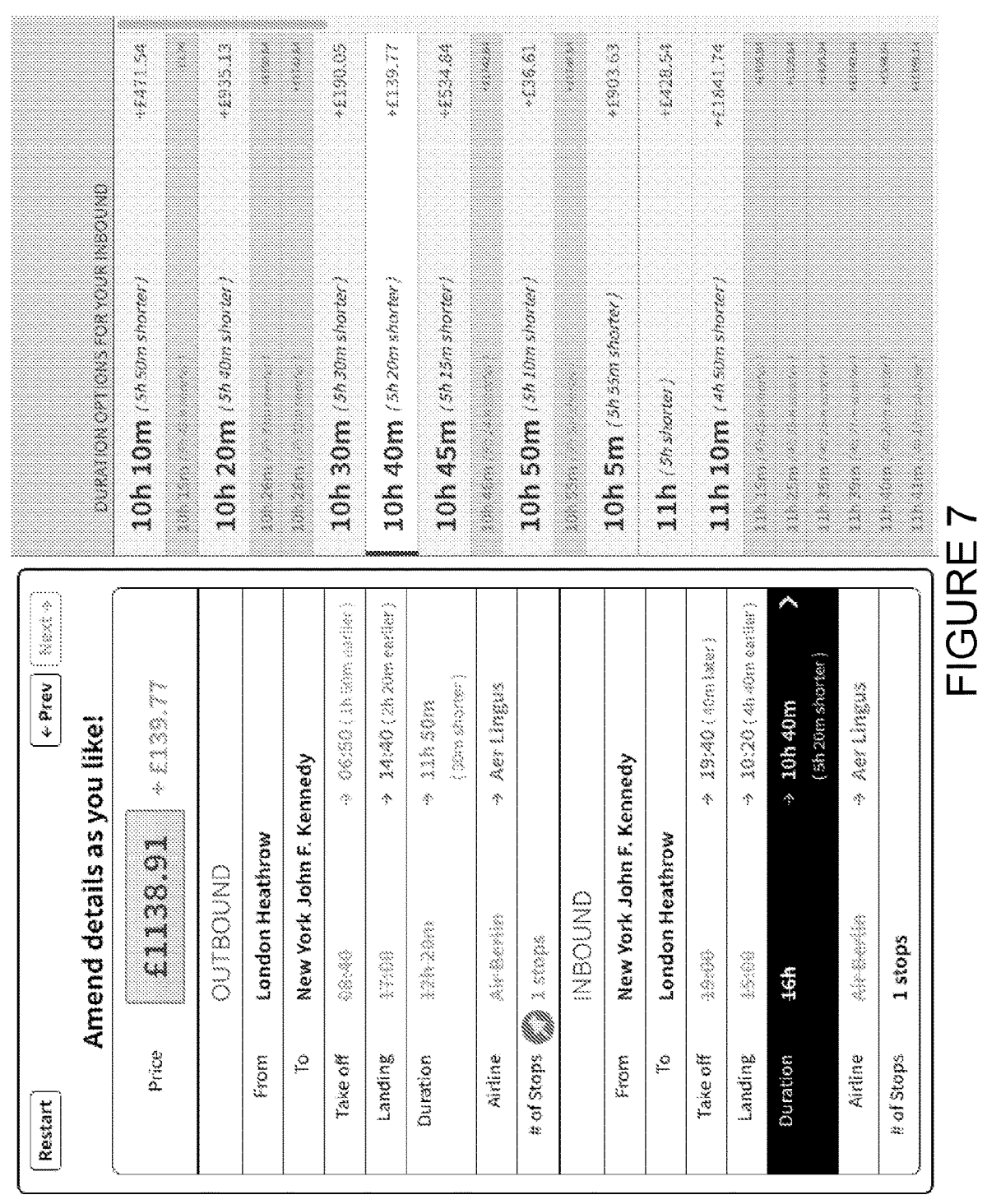

The user may begin looking for a flight which they prefer to the currently selected flight, by interacting with the user interface. For example, a user may decide to look for a flight with a shorter duration inbound flight leg. The user selects (eg. clicks on) the duration for the inbound flight leg. In response, the user interface displays the available selectable options for the duration of the inbound flight leg (eg. shorter durations or longer durations), in a different part of the screen to the original flight information, such as in a list, for example together with the price difference compared to the currently selected flight. Flights which meet the current pinning criteria (eg. non-stop for the outbound leg is pinned) may be displayed more prominently (eg. in larger bolder font) than other flights. The currently selected flight may be highlighted. Flights which do not meet the current pinning criteria (eg. non-stop is pinned) may be displayed less prominently (eg. in small grey font); such flights which do not meet the current pinning criteria may be selected, but any such selection may result in one or more of the pinning criteria being unpinned. If a different duration is selected for the inbound leg, that duration may be pinned for the inbound leg. A list of different flight leg durations may be scrollable, so as to provide more flight leg durations. An example which shows different available inbound flight leg duration times on the right hand side of the screen is shown in FIG. 7.

When the user identifies (eg. brings their cursor over) a selectable option for a different duration for the inbound flight leg, the user interface may display comparative flight information, which is the flight information for the flight for the selectable option for the different duration for the inbound flight leg, which is different to the duration in the original flight inbound leg, and the differences between data fields for the two flights. For example, if the original flight was $630 and the new flight with a 10 hour shorter duration for the inbound leg is $830, the interface may display the original flight price as $630, with +$200 indicated as the price difference. A data field or data field difference may be colour coded, as explained above, for example. An example which includes comparative flight information for a shorter duration inbound flight leg when compared to the currently selected inbound flight leg is shown in FIG. 7.

Figure 8:
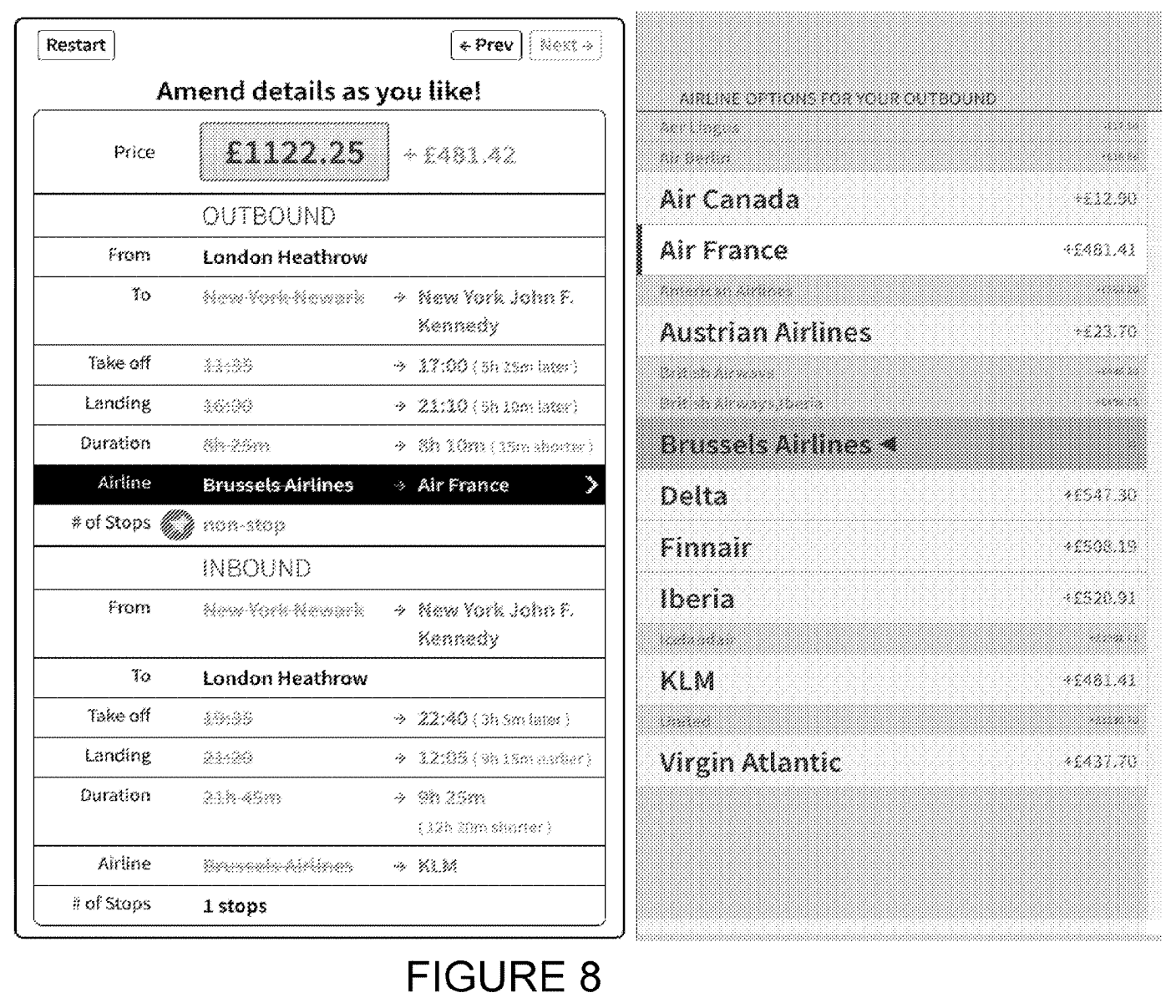

The user may begin looking for a flight which they prefer to the currently selected flight, by interacting with the user interface. For example, a user may decide to look for a flight with a different carrier on the outbound flight leg. The user selects (eg. clicks on) the carrier for the outbound flight leg. In response, the user interface displays the available selectable options for the carrier for the outbound flight leg, in a different part of the screen to the original flight information, such as in a list, for example together with the price difference compared to the currently selected flight. Flights which meet the current pinning criteria (eg. non-stop for the outbound leg is pinned) may be displayed more prominently (eg. in larger bolder font) than other flights. The currently selected flight may be highlighted. Flights which do not meet the current pinning criteria (eg. non-stop is pinned) may be displayed less prominently (eg. in small grey font); such flights which do not meet the current pinning criteria may be selected, but any such selection may result in one or more of the pinning criteria being unpinned. An example which shows different available carriers for the outbound flight leg on the right hand side of the screen is shown in FIG. 8.

When the user identifies (eg. brings their cursor over) a selectable option for a different carrier for the outbound flight leg, the user interface may display comparative flight information, which is the flight information for the flight for the selectable option for the different carrier for the outbound flight leg, which is different to the carrier in the original flight outbound leg, and the differences between data fields for the two flights. For example, if the original flight was $830 and the new flight with a different carrier for the outbound leg is $1230, the interface may display the original price as $830, with +$400 indicated as the price difference. A data field or data field difference may be colour coded, as explained above, for example. If a different carrier is selected for the outbound leg, that selected carrier may be pinned for the outbound leg. An example which includes comparative flight information for a different carrier outbound flight leg when compared to the currently selected outbound flight leg is shown in FIG. 8.

Some parameters may not be pinned precisely. For example a departure time or an arrival time, when pinned, selects a range (eg. +/−1 hour) with respect to the pinned time. The reason is that if an exact time such as 17:05 were pinned, it is unlikely that few or any other flights would meet the criterion. The pinned time range may be user selectable or predefined. An example of a screen output corresponding to a pinned arrival time for an outbound leg is shown in FIG. 9.

In an example, if a flight leg duration is pinned, the user interface will provide all flight legs of the same or lesser duration. In an example, if a flight leg duration is pinned, the user interface will provide all flight legs less than the current duration plus an acceptable difference (eg. +1 hour), in which the acceptable difference may be predefined, or user defined.

Some parameters may be pinned precisely. For example, if the departure airport is pinned as London Gatwick, then only departures from London Gatwick will be presented for selection in the user interface. In another example, pinning an airport in a city, such as for departures, will restrict departures only to airports of that city.

The user interface may include forward and back buttons, so the user may move between the currently selected flight and previously selected flights, in case for example they wish to go back to a previously selected flight, or for example they wish to compare the currently selected flight with a flight they selected earlier. An example is shown in FIG. 9, in which a "Prev" button is provided for viewing previously selected flights. An example is shown in FIG. 9, in which a "Next" button is provided for viewing the next flight in a sequence of previously selected flights.

In an example, when a parameter is selected for variation (eg. carrier for outbound leg, departure time for inbound leg), the list of flights presented in response provides only a price difference. In another example, when a parameter is selected for variation (eg. carrier for outbound leg, departure time for inbound leg), the list of flights presented in response provides a plurality of difference fields.

In an example, the flight carrier of an outbound flight leg is selected for variation. When an alternative carrier is identified, (eg. by hovering a cursor over the alternative carrier), in response, the original carrier is shown crossed out in the outbound flight leg data, and the alternative identified carrier is shown instead. Furthermore the take off time will typically change from a first time (eg. shown crossed out) to a second time, and the time difference data may be shown. Changes to the landing time and to the duration time may be shown in a similar way. Corresponding changes to the inbound flight leg which is being offered together with the identified alternative outbound flight leg are presented in the Inbound flight section of the user interface. An example is shown in FIG. 10, in which the currently selected airline is British Airways, but the airline Air France is being identified (eg. by hovering a cursor over Air France), and in response, the carrier British Airways is shown crossed out in the outbound flight leg data, and Air France is shown instead. Furthermore the take off time has changed from 11:25 (crossed out) to 17:00, and the difference data "5 h 35 m later" is shown. Changes to the landing time and to the duration time are shown in a similar way. Corresponding changes to the inbound flight leg which is being offered together with the Air France outbound flight leg are presented in the Inbound section of the user interface. A further example is shown in FIG. 11, in which the currently selected outbound leg airline is British Airways, but the airline American Airlines is being identified (eg. by hovering a cursor over American Airlines), and in response, the carrier British Airways is shown crossed out in the outbound flight leg data, and American Airlines is shown instead.

In an example, when a parameter is selected for variation (eg. carrier for outbound leg, or departure time for inbound leg), a list of flights is presented in response, and when a selectable flight is identified (eg. by moving a cursor over the selectable flight) in the user interface new data corresponding to the new flight is displayed next to old data corresponding to the currently selected flight leg data, in which the old data is shown crossed out. Difference field data may be presented next to the new data fields.

In an example user interface, pinning may happen in response to user selection of a particular parameter, eg. selecting a carrier for an outbound flight leg causes that carrier to be pinned automatically for the outbound flight leg. This may be referred to as "auto-pinning". In a further example user interface, pinning may happen only in response to a user selection to explicitly pin a particular parameter.

Figure 12:
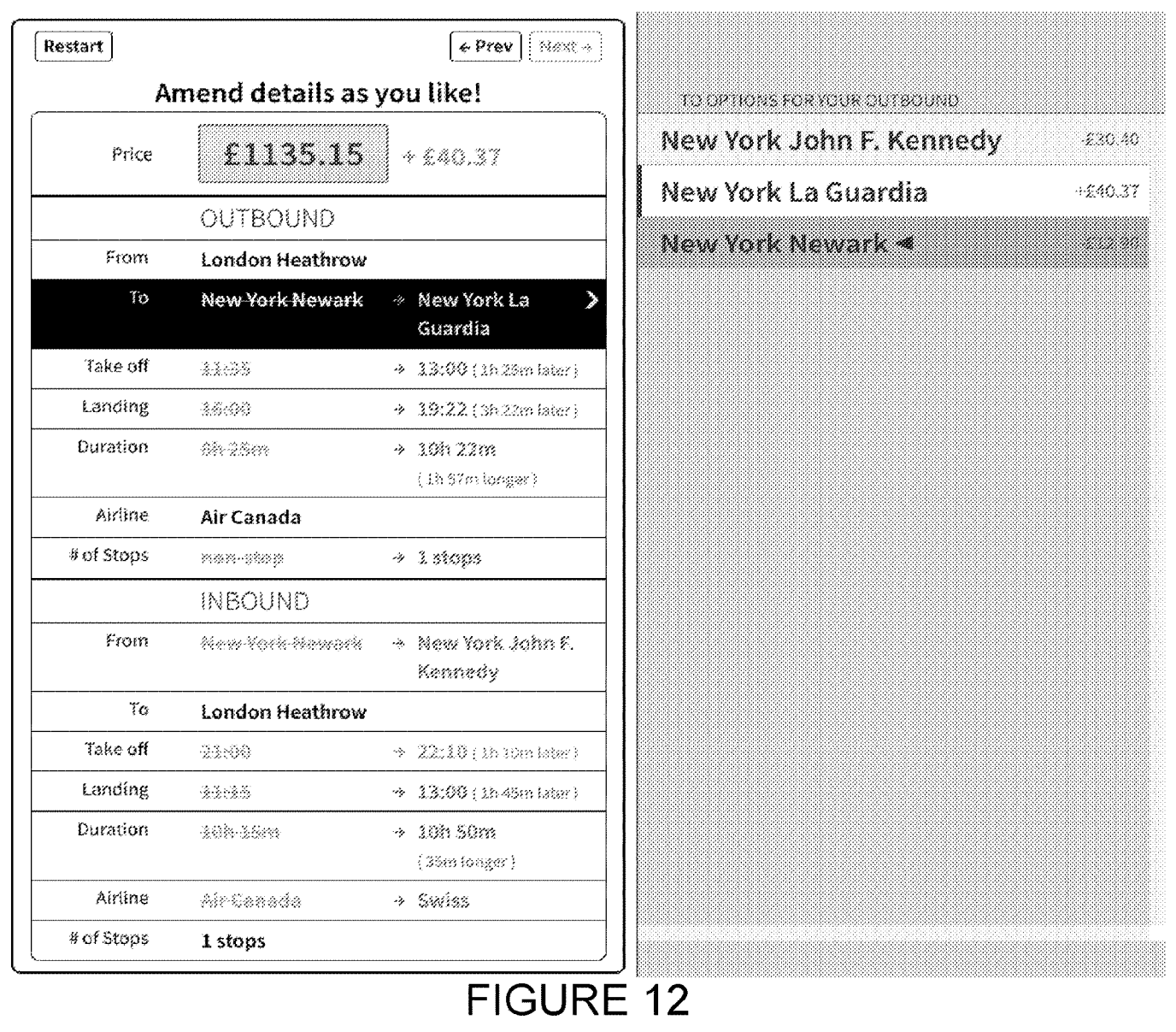

In an example user interface, when an airport in a city with multiple airports is selected as a departure or arrival airport, a list of available alternative airports is shown. An example is shown in FIG. 12, for New York, N.Y., USA as the outbound arrival airport city.

In an example user interface, when an airport in a city with multiple airports is selected as a departure or arrival airport, instead of showing a list of available alternative airports, the available airports may be shown on a map. This would be useful for people unfamiliar with where various airports are located with respect to a city.

In an example user interface, it is possible to group take off time, landing time and duration, because if a user changes one of these parameters, the rest will change accordingly.

After having determined their preferred flight, following interaction with the user interface, a user may make a final selection of the flight, and proceed to booking and payment.

Computer-Based Interactive Method to Compare Search Results with Multiple Attributes There is provided a method for displaying search results, where:

(1) The user submits a query with desired conditions about the results,
(2) The system matches its database against the given conditions,
(3) The system pre-processes the results to create an interim database,
  (3.1) The interim database may group the closely-connected attributes together
(4) The user can choose each attribute from a result to effectively select another result, while
  (4.1) With certain pre-selected attributes, the user's choice may be non-exclusive and selects a range of values instead of the specific value
  (4.2) Alternative options for each attribute are sorted in a contextually sensible way for the respective attribute (for an example, temporal order for time factor or alphabetical order for names)
(5) With every change, the user is informed about the other related changes caused.

This approach allows the user to easily find the alternatives for each attribute in his/her own priority, knowing the gain or trade-off the alternative will make.

An overview of an example search algorithm is provided in FIG. 13. Examples of data tables which relate to an example flight search are shown in FIG. 14; the data tables of FIG. 14 may relate to the example search algorithm provided in FIG. 13. FIG. 15 shows an example sequence diagram, which may relate to the data tables of FIG. 14, and which may relate to the example search algorithm provided in FIG. 13.

In an example search method, in a first step (101) an initial query retrieves results from a master database (201), and results are cached in a database (202). In a second step (102), attribute settings (203) are generated from the results data; each attribute has a default locked flag set to false; the type of lock is decided by the data type of each attribute. In a third step (103), one or more results are selected based on the pre-defined criteria (204) (eg. cheapest price). In a fourth step (104), if there are multiple results, a user selects one of the results. From the selected result, a user can pin or unpin any attributes (105), thereby updating a "Pinned" value in attribute settings (203). A user can confirm one of the selected results as the final outcome (109). Alternatively, a user can choose an attribute from a selected result to change it (106). Possible alternatives for the selected attribute are filtered and sorted from the cached results (202) based on the attribute table (203), and generated as the alternatives table (205). When two or more results have same value for the selected attribute, the representative result will be chosen among them based on pre-defined criteria (107) (eg. cheapest price). A user can select (108) one of the alternative attributes, updating the selected result (204), and then going back to the third step. An overview of an example search algorithm is provided in FIG. 13.

A master database (201) is provided. A database (202) for caching search results from a master database (201) is provided. Attribute settings (203) may be generated from the cached search results data. It is provided that a user can select an alternative attribute, thereby updating a selected result (204). Possible alternative results based on a selected attribute may be filtered and sorted from the cached results (202) based on the attribute table (203), and may be generated as an alternatives table (205). Examples of data tables which relate to an example flight search are shown in FIG. 14.

In a search process, in a first step (101), a search query is sent from an end user to a master database (201), and the master database sends search results to a results cache (202). In a second step (102), attribute settings are derived from the cached results, and stored as attribute settings. In a third step (103), preferences are selected from the attribute settings from which recommended results are obtained from the cached results and transmitted to the end user. In a fourth step (104) the end user selects the highlighted result (204), which is obtained from the cached results. In a fifth step (105) the end user pins one or more attributes which are then updated in the attribute settings. In a sixth step (106), an end user chooses an attribute. In a seventh step (107), the chosen attribute is used, taking into account preferred or the pinned attributes in the attribute settings, to filter results in the cached results, and then, taking into account preferred or the pinned attributes in the attribute settings, the filtered results are sorted, and alternative results based on the selected attribute are provided to the end user. The user may then choose to go back to the sixth step (106). In an eighth step (108), the end user may choose an alternative for the selected attribute and then go back to the fourth step (104). In a ninth step (109), the end user may confirm the result as the final result. FIG. 15 shows an example sequence diagram, which may relate to the data tables of FIG. 14, and which may relate to the example search algorithm provided in FIG. 13.

Aspects of the invention can be applied to any cases where a user needs to negotiate among multiple attributes in the search results in order to find the best result based on his/her own priority. The areas of application include, but are not limited to:

Flights comparison search;
Hotels comparison search;
Car hire comparison search;
Insurance comparison search; or
Energy provider comparison search.

In an example, a search relating to an aspect of the invention may be provided for one or more of: flights, hotels, car hire and travel. A start city and a destination city may be defined. A date range for the search may be provided. A selectable option may be provided to toggle between a search result list and a next-best search result. In a flight search interface, a number of search results may be selected and indicated as e.g. the cheapest, shortest or best flight itinerary according to predefined or user-selectable criteria. For an outbound flight leg, one or more attributes may be locked in the next-best search. For an inbound flight leg, one or more attributes may be locked in the next-best search. Selecting an attribute of an outbound flight leg may provide a list of alternative search results, which may be an ordered list, which may be ordered according to a predefined criterion (eg. shortest duration flights first), or which may be ordered according to a user selectable criterion. A selectable option may be provided to book a particular displayed search result. An example implementation is shown in FIG. 16.

To Search is Computer; to Choose is Human

The business of price comparison has been built around the concepts of "searching."

Searching is, according to Wikipedia, using the computer to find an item with specified properties among a collection of items. Basically, it's one of the things that the computers can compute very well. A computer can quickly go through massive amounts of data to find the item(s) with the queried conditions. If you are looking for a particular file in your 20-year old archive, being able to search the list with a couple of keywords is nothing less than a godsend.

However, at least in the context of price comparison, the search "results" are NOT the final outcome the user wants. The results of a price comparison search are usually a massive list of items with multiple attributes, where the user will then have to perform comparison tasks across each of them; in order to try to find the best one among them.

For a flight search, as an example, each item has different combination of the attributes—such as airline(s), take-off time, landing times, airports, stopovers and price just to name a few. Once the search results are loaded, the user needs to go through the list, trying to figure out the differences between the items: The cheapest ticket may have one too many stops, the cheapest direct flight may arrive too late, and you don't like the airline who flies at reasonable times.

It's like looking at a slot machine—you see random items appearing for each wheel, feeling hopeless without any power of controlling them individually. We know that our brains are not very good at making sense of such complexity. There may be filters and sorting options to help the user somehow narrow down the result set to go through. However, hiding items with less desirable attributes may not guarantee the user to find the best deal—such as a direct flight only with extra $5 over the price of indirect one, or a hotel with breakfast included for the same price just a couple of blocks farther from the train station. And those tools we provide to help users are, after all, also designed based on how the computer works—rather than how the people think. So how do the People Think?

Human brains' information processor is powered by attention. In more natural context, we prefer to talk about one thing at a time. It may not be the most efficient way to compare stuff, but that's just how our brains work. Say you visited a travel agency and asked to arrange a trip to Moscow. They won't give you thousands of flight search results. They start by recommending a couple of alternatives, then we talk. "You don't like its late arrival? Here's an alternative with earlier arrival, but it will depart at 6 am. You prefer to stay at a Holiday Inn to earn mileage? It doesn't have a gym you said you needed. You feel like driving an electric vehicle to go green? It's only available with 2 doors and no bike carrier."

This kind of conversation is not necessarily the most efficient way of communication, but it's certainly the most manageable way for our brains to compare one multi-attributed item to another. We negotiate the attributes between options, finding the right tradeoff point.

A Way to Support the Human Brains

What if we could provide an interactive system that works like that all-friendly person in a travel agency, showing the best options first and then provide the next-best options as we talk about each attribute we care?

That's where this project has started. An exemplar set of results from a flight search was downloaded, and built as a proof-of-concept prototype (an example is shown in FIG. 17), alongside a more visual design mockup (an example is shown in FIG. 18).

Further examples are shown in FIGS. 1 to 12.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

A portion of this specification includes material to which a claim for copyright is made and notice is hereby given: Copyright Skyscanner Limited 2016, 2017 (pursuant to 17 USC 401 and equivalent laws). The copyright owner has no objection to the facsimile reproduction by anyone of the patent document or disclosure, as in appears in any Patent Office file, record or official publication, but reserves all other copyrights, rights in and to designs (whether protected through a design patent, registered design or unregistered design), trade dress rights and trademark rights. No express or implied license under any of these rights is granted.

The invention claimed is:

1. A computer-implemented method of providing a set of alternative search results, the method including the steps of:
   receiving a search request;
   (ii) searching a database to provide a first set of a plurality of search results, each search result including a plurality of attributes;
   (iii) identifying a best search result as an initially highlighted search result;
   (iv) providing the initially highlighted search result for display;
   (v) receiving a selection of an attribute in the initially highlighted search result;
   (vi) performing an alternative search in which the set of alternative search results is generated, in which in the alternative search the selected attribute is varied with respect to the initially highlighted search result, and
   (vii) providing the set of alternative search results for display.

2. The method of claim 1, further including the step of:
   (viii) receiving a selection of a result in the set of alternative search results, which identifies a new highlighted search result.

3. The method of claim 2, in which the new highlighted search result is provided for display, and in which the previous highlighted search result is not provided for display or is provided in a separate section of the screen from the new highlighted search result.

4. The method of claim 2, in which following the received selection of the result in the set of alternative search results, which identifies the new highlighted search result, a user is informed about other changes related to the new highlighted search result, wherein the new highlighted search result has resulted in a change to the highlighted search result.

5. The method of claim 1, in which (a) the set of alternative search results for display are displayed in a different part of a screen to the highlighted search result, or (b) the set of alternative search results are sorted contextually for the selected attribute, or (c) the method allows a user to view alternatives for each attribute.

6. The method of claim 1, in which the set of alternative search results is derived from the first set of the plurality of search results.

7. The method of claim 1, wherein the first set of the plurality of search results is cached in a cache database.

8. The method of claim 1, wherein in steps (vi) and (vii), preferred or pinned attributes are received in attribute settings; the selected attribute is used, taking into account the preferred or the pinned attributes in the attribute settings, to filter results in cached results, and then, taking into account the preferred or the pinned attributes in the attribute settings, the filtered results are sorted, and alternative results based on the selected attribute are provided to an end user.

9. The method of claim 1, wherein the first set of the plurality of search results is pre-processed to create an interim database.

10. The method of claim 9, wherein in the interim database, closely-connected attributes are grouped together.

11. The method of claim 1, in which the set of alternative search results for display include, for each alternative search result, for at least one attribute, a difference between the at least one attribute of the alternative search result and the highlighted search result.

12. The method of claim 11, including an attribute being selected for variation with respect to the initially highlighted search result, and the set of alternative search results being provided for display, such that the set of alternative search results provided for display provides only a price difference for each search result relative to the initially highlighted search result.

13. The method of claim 11, (a) wherein the set of alternative search results for display include, for each alternative search result, for a plurality of attributes, differences between the plurality of attributes of the alternative search result and the highlighted search result, or (b) including an attribute being selected for variation with respect to the initially highlighted search result, and the set of alternative search results being provided for display such that the set of alternative search results provided for display provides a plurality of differences which are difference fields.

14. The method of claim 13, including displaying differences, wherein displaying differences includes showing highlighted search result fields which differ from the alternative search result as crossed out.

15. The method of claim 13, wherein the differences include a price difference.

16. The method of claim 1, (a) wherein receiving a selection of an attribute in the highlighted search result includes providing in response a visual emphasis of the attribute in the highlighted search result, or (b) wherein receiving a selection of an attribute in the highlighted search result includes detecting the position of a cursor over a data field which is changeable, in response to which there is displayed an indication that the field is indeed changeable by providing an appropriate text, icon or graphic, which when selected, allows a user an option to adjust the data in the field, or (c) in which a highlighted search result is a cheapest result.

17. The method of claim 1, in which a first search result is displayed before step (vi) has been completed.

18. The method of claim 17, in which the first search result is updated by one or more subsequent better search results, before step (vi) has been completed.

19. The method of claim 1, (a) in which receiving a selection of an attribute in the highlighted search result includes receiving a selection of a group of interdependent attributes in the highlighted search result, or (b) in which from a highlighted search result, a user can pin or unpin any attributes, or (c) in which the highlighted search result includes fields, in which after changing a field in the highlighted search result, the changed field is pinned in the sense that a value of the changed field becomes a fixed parameter in the highlighted search result.

20. The method of claim 1, (a) in which a pinned parameter in a user interface is unpinned by clicking on a parameter field, in the user interface, or (b) in which an unpinned parameter in a user interface is pinned by clicking on a parameter field, in the user interface, or (c) including the step of receiving a selection of a pinning feature so that an attribute is locked.

21. The method of claim 1, in which selection of a pinning feature pins a range of values of an attribute.

22. The method of claim 21, in which the range of values is pre-defined or user-defined.

23. The method of claim 1, including receiving pinning of an attribute, in which the pinning affects an algorithm for selecting a representative alternative option, wherein a search result with a different option for the pinned attribute is excluded from a process of selecting alternative options, or wherein a search result with a different option for the pinned attribute is computationally tagged to indicate that the search result contains one or more conflicting values to the pinned attribute.

24. The method of claim 1, including receiving pinning of a criterion, and including receiving selection of a search result, in which if the selected search result does not meet the pinned criterion, then the pinned criterion is unpinned automatically.

25. The method of claim 1, in which results provided for display are provided for display on a screen of a mobile device.

26. The method of claim 1, wherein the search results include a range of values, (a) wherein the range of values is a range of values of flight durations, which are same or lesser duration, compared to the initially highlighted search result, or (b) wherein the range of values is a range of values of flight durations, which are less than a duration associated with the initially highlighted search result plus a difference threshold.

27. The method of claim 1, wherein the search request relates to flights, hotels, travel insurance or car hire.

28. The method of claim 27, wherein the search request relates to flights.

29. The method of claim 28,
(a) in which a flight search request is a search for one-way or return flights from a named city or airport to a named city or airport, and includes dates or date ranges for a flight leg or flight legs, or
(b) including receiving a city being designated as a designated city, wherein the search includes all airports associated with the designated city, or all airports within a predefined, or user defined, distance of the designated city, or
(c) in which a search result for an outbound flight leg includes start airport, destination airport, take-off time, landing time, flight duration, airline name, and number of stops, or
(d) in which a search result for an inbound flight leg includes start airport, destination airport, take-off time, landing time, flight duration, airline name, and number of stops, or
(e) in which an attribute is a number of stops in a flight leg, a flight leg departure time, a flight leg duration, or a flight carrier, or
(f) in which when an airport in a city with multiple airports is selected as a departure or arrival airport, a list of available alternative airports is shown, or
(g) in which when an airport in a city with multiple airports is selected as a departure or arrival airport, instead of showing a list of available airports, available alternative airports are shown on a map, or
(h) in which it is possible to group take-off time, landing time and duration.

30. The method of claim 1, wherein the set of alternative search results comprises a plurality of search results each having a value for the selected attribute that is different to the value of the selected attribute in the initially highlighted search result.

31. A computer program product embodied on a non-transitory storage medium, the computer program product executable on a processor to provide a set of alternative search results, the computer program product executable to:
(i) receive a search request;
(ii) search a database to provide a first set of a plurality of search results, each search result including a plurality of attributes;
(iii) identify a best search result as an initially highlighted search result;
(iv) provide the initially highlighted search result for display;
(v) receive a selection of an attribute in the initially highlighted search result;
(vi) perform an alternative search in which the set of alternative search results is generated, in which in the alternative search the selected attribute is varied with respect to the initially highlighted search result, and
(vii) provide the set of alternative search results for display.

32. The computer program product of claim 31, wherein the set of alternative search results comprises a plurality of search results each having a value for the selected attribute that is different to the value of the selected attribute in the initially highlighted search result.

33. A server including a processor and a computer program product embodied on a non-transitory storage medium, the computer program product executable on the processor to:
receive a search request;
(ii) search a database to provide a first set of a plurality of search results, each search result including a plurality of attributes;
(iii) identify a best search result as an initially highlighted search result;
(iv) provide the initially highlighted search result to a client computer;
(v) receive a selection of an attribute in the initially highlighted search result;
(vi) perform an alternative search in which a set of alternative search results is generated, in which in the alternative search the selected attribute is varied with respect to the initially highlighted search result, and
(vii) provide the set of alternative search results to the client computer.

34. The server of claim 33, wherein the set of alternative search results comprises a plurality of search results each having a value for the selected attribute that is different to the value of the selected attribute in the initially highlighted search result.

* * * * *